(12) United States Patent
Nishiyama et al.

(10) Patent No.: US 8,955,637 B2
(45) Date of Patent: Feb. 17, 2015

(54) MOTORCYCLE HAVING A SWING ARM SUSPENDED FROM A REAR SUSPENSION VIA A LINK MECHANISM

(75) Inventors: Takashi Nishiyama, Akashi (JP); Masato Kogirima, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 624 days.

(21) Appl. No.: 12/892,263

(22) Filed: Sep. 28, 2010

(65) Prior Publication Data

US 2011/0079458 A1 Apr. 7, 2011

(30) Foreign Application Priority Data

Oct. 2, 2009 (JP) ................................ P2009-230636

(51) Int. Cl.
*B62K 13/04* (2006.01)
*B62K 25/28* (2006.01)

(52) U.S. Cl.
CPC ............. *B62K 25/283* (2013.01); *B62K 25/286* (2013.01)
USPC ........................................................ 180/309

(58) Field of Classification Search
USPC .......... 180/227, 218, 219, 225, 309; 181/275; 60/324
See application file for complete search history.

(56) References Cited

U.S. PATENT DOCUMENTS

| | | | | |
|---|---|---|---|---|
| 4,322,088 A | * | 3/1982 | Miyakoshi et al. | 280/284 |
| 4,440,413 A | * | 4/1984 | Miyakoshi et al. | 280/284 |
| 4,469,190 A | * | 9/1984 | Yamaguchi | 180/219 |
| 4,489,803 A | * | 12/1984 | Fukuchi | 180/227 |
| 4,506,755 A | * | 3/1985 | Tsuchida et al. | 180/227 |
| 4,572,317 A | * | 2/1986 | Isono et al. | 180/227 |
| 4,574,909 A | * | 3/1986 | Ribi | 180/227 |
| 4,673,053 A | * | 6/1987 | Tanaka et al. | 180/227 |
| 4,753,314 A | * | 6/1988 | Tsukiji | 180/227 |
| 4,781,264 A | * | 11/1988 | Matsuzaki et al. | 180/219 |
| 6,290,017 B1 | * | 9/2001 | Ito | 180/227 |
| 7,665,568 B2 | * | 2/2010 | Doperalski et al. | 180/358 |
| 2006/0242952 A1 | * | 11/2006 | Muramatsu et al. | 60/299 |
| 2006/0283650 A1 | * | 12/2006 | Kawamura et al. | 180/227 |
| 2008/0116004 A1 | * | 5/2008 | Muto | 181/228 |
| 2008/0210203 A1 | * | 9/2008 | Sugiyama | 123/509 |
| 2008/0236152 A1 | * | 10/2008 | Morita et al. | 60/324 |

FOREIGN PATENT DOCUMENTS

| | | | | |
|---|---|---|---|---|
| JP | 61-92979 | | 5/1986 | |
| JP | 02020487 A | * | 1/1990 | ............ B62K 25/26 |
| JP | 03065482 A | * | 3/1991 | .............. B62J 13/04 |

(Continued)

*Primary Examiner* — Tony Winner
(74) *Attorney, Agent, or Firm* — Wenderoth, Lind & Ponack, LLP

(57) ABSTRACT

A motorcycle including a multi-cylinder engine; a main frame; and a swing arm for supporting a rear wheel in a rear portion of the main frame. A rear suspension has one end rotatably supported by a portion located in a position above a swing axial support portion of the swing arm. A link mechanism connects the rear suspension and the swing arm, and includes a suspension arm rotatably supported by an upper portion of the swing arm and a link member having one end rotatably supported by the main frame. An exhaust collecting pipe is arranged below the multi-cylinder engine; and an exhaust device is arranged in a space below the swing arm. An exhaust connecting pipe connects an outlet of a rear end of the exhaust collecting pipe with a front surface of the exhaust chamber in a moving direction of the motorcycle.

13 Claims, 23 Drawing Sheets

(56) References Cited

FOREIGN PATENT DOCUMENTS

| JP | 03136993 A * | 6/1991 | ............. B62K 25/20 |
| --- | --- | --- | --- |
| JP | 4-95586 | 8/1992 | |
| JP | 2000-85670 | 3/2000 | |
| JP | 2003-112678 | 4/2003 | |
| JP | 2005-162000 | 6/2005 | |
| JP | 2006-273280 | 10/2006 | |
| JP | 2006-347472 | 12/2006 | |
| JP | 2008-238936 | 10/2008 | |
| JP | 2009-90888 | 4/2009 | |

* cited by examiner

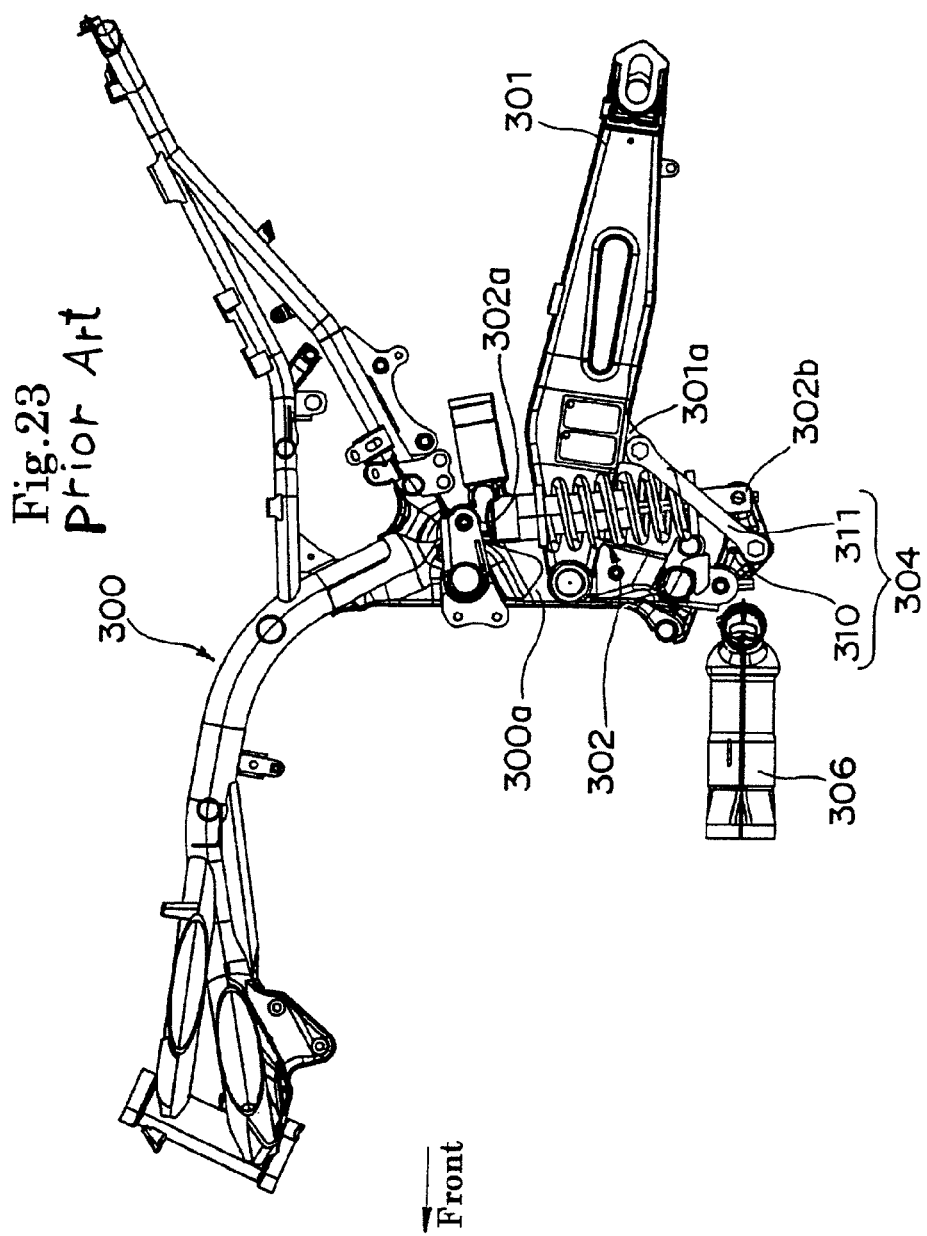

MOTORCYCLE HAVING A SWING ARM SUSPENDED FROM A REAR SUSPENSION VIA A LINK MECHANISM

BACKGROUND OF THE INVENTION

1. Field of the Invention

The present invention relates to a motorcycle. More specifically, the present invention relates to a motorcycle in which a swing arm is resiliently suspended from a rear suspension via a link mechanism.

2. Description of the Prior Art

As a conventional example, a motorcycle is disclosed in Japanese Patent Application Laid-Open (JP-A) No. 2006-347472. FIG. 23 shows a vehicle body frame 300, and a swing arm 301 and a rear suspension (rear shock absorber) 302 for supporting a rear wheel of the motorcycle of the conventional example. The swing arm 301 is supported by a swing arm bracket portion 300a formed in the lower portion of the vehicle body frame 300 so as to be swingable in the up-down direction and extend rearwardly. In addition, the rear suspension 302 is vertically arranged so as to be along the substantially up-down direction, and protrudes upwardly and downwardly from the swing arm 301. An upper end 302a of the rear suspension 302 is rotatably supported by the vehicle body frame 300 in a position above the swing arm 301. A lower end 302b of the rear suspension 302 is located below the lower end of the swing arm bracket portion 300a and is connected to the lower end of the swing arm bracket portion 300a via a link mechanism 304.

The link mechanism 304 includes a substantially triangular suspension arm 310 and a tie rod 311. The suspension arm 310 has a front end rotatably coupled to the lower end of the swing arm bracket portion 300a, a rear end rotatably coupled to the lower end 302b of the rear suspension 302, and a center portion rotatably coupled to the lower end of the tie rod 311. The tie rod 311 extends rearwardly and upwardly from the suspension arm 304, and is rotatably connected to an attaching portion 301a formed on the lower surface of the swing arm 301.

As with the conventional example of FIG. 23, in the configuration in which the lower half portion of the vertically arranged rear suspension 302 protrudes downwardly from the swing arm 301, the suspension arm 310 of the link mechanism 304 is connected to the lower end of the swing arm bracket portion 302a, and the entire tie rod 311 is arranged under the swing arm 301, the lower space of the swing arm 301 and the swing arm bracket portion 300a cannot be effectively used for arranging various devices for a vehicle.

As an example of the devices for the vehicle, there is, e.g., an exhaust device. The exhaust device includes an exhaust pipe, a catalytic pipe, a collecting pipe, an exhaust chamber 306, and an exhaust muffler, and is arranged from an exhaust outlet in the front portion of an engine to the exhaust muffler in the rear portion of the vehicle. However, the lower space below the swing arm 301 and the swing arm bracket portion 300a cannot be effectively used for the exhaust device. Therefore, in the conventional example, the exhaust chamber 306 having a large volume is arranged in front of the swing arm bracket portion 300a, with the result that the length of the vehicle in the front-rear direction is increased. In addition, as the engine is arranged in front of the swing arm bracket portion 300a, the volume of the exhaust chamber 306 is limited.

In particular, in motorcycles for sports and races, the volume of the exhaust chamber 306 is required to be increased in order to cope with the exhaust gas and noise regulation in recent years, but it is difficult to cope with it.

In addition, if the exhaust chamber 306 is arranged beneath the swing arm bracket portion 300a of FIG. 23, the problem of increasing the size of the vehicle in the up-down direction arises in order to secure the minimum ground clearance of the vehicle.

SUMMARY OF THE INVENTION

The present invention has been made in view of the above problems and an object of the present invention is to provide a motorcycle capable of holding the size of the vehicle in the front-rear direction and in the up-down direction to be compact by devising the configuration of a rear suspension and a link mechanism and enabling the lower space below a swing arm and a swing arm bracket portion to be effectively used for arranging a device for the vehicle.

To achieve the above object, a motorcycle according to the present invention has a swing arm for supporting a rear wheel in the rear portion of a main frame so as to be swingable in the up-down direction. The motorcycle comprising: a rear suspension, in other words a rear shock absorber, suspending the swing arm from the main frame and, the rear suspension having one end rotatably supported by a portion located in the position above a swing axial support portion of the swing arm and below the upper end of the main frame, and the rear suspension extending rearwardly in a position above the swing arm; and a link mechanism connecting the rear suspension and the swing arm. The link mechanism has a suspension arm rotatably supported by the upper portion of the swing arm and a link member having one end rotatably supported by the main frame. The suspension arm includes a first pivot portion rotatably supporting the other end of the rear suspension and a second pivot portion rotatably connecting the other end of the link member.

In the motorcycle according to the invention, the following configurations are preferably applicable.

(a) An exhaust device, e.g., an exhaust chamber, is arranged under the rear suspension.

(b) The main frame has an opening for tool insertion at a position corresponding to the one end of the rear suspension and the vicinity thereof, as seen in the vehicle width direction.

(c) The rear suspension is arranged on one side in the vehicle width direction with respect to a vehicle width centerline.

(d) A vehicle configuring member covering the upper side of the rear suspension is provided. The vehicle configuring member has a recess portion that is able to accommodate at least the upper portion of the rear end portion of the rear suspension.

(e) In a configuration in which the rear suspension is arranged on one side in the vehicle width direction, a fuel pump is arranged on the other side in the vehicle width direction and at the lower end height of a fuel tank or a height lower than that.

(f) An attaching portion for attaching one end of the rear suspension is formed on a cross member in the rear portion of the main frame, and the attaching portion is integrally formed with a nut engaging and holding portion which non-rotatably engages and holds a nut for fixing the rear suspension.

(1) According to the present invention, while the size of the vehicle in the up-down direction and in the front-rear direction is maintained so as to be compact, the lower space of the swing arm can be effectively used for arranging various devices.

(2) The rear suspension is arranged in the position above the swing arm so as to extend in the substantially front-rear direction. A load applied from the rear wheel via the swing arm to the rear suspension is applied to a front fork for the front wheel via the main frame, thereby increasing a grip force of the front wheel with respect to the ground. In other words, a stable grip force can be exhibited during cornering so that cornering performance can be improved.

(3) According to the configuration requirement (a), the space below the swing arm can be effectively used for arranging the exhaust chamber, the volume of the exhaust chamber can be increased, and the entire exhaust device can be arranged so as to be compact.

(4) According to the configuration requirement (b), the detaching operation of the rear suspension can be easily performed by inserting a tool from the side of the vehicle without detaching a member for the vehicle, such as a seat.

(5) According to the configuration requirement (c), the side space of the rear suspension can be used for arranging a component having a relatively large volume, e.g., a battery or an ABS unit.

(6) According to the configuration requirement (d), a member covering the upper side of the rear suspension, e.g., a battery case or a rear fender, can be arranged to be close to the rear suspension so that the portion around the rear suspension can be compact. In particular, the size in the up-down direction can be compact.

(7) According to the configuration requirement (e), the side of the rear suspension can be effectively used for arranging the fuel pump, and even when fuel in the fuel tank is moved at the time of acceleration and deceleration, air suction of the fuel pump can be prevented without stopping the fuel supply to the fuel pump.

(8) According to the configuration requirement (f), in the attaching and disassembling operation of the rear suspension, the operator can easily attach the rear suspension simply by rotating a bolt without holding the nut with a tool.

BRIEF DESCRIPTION OF THE DRAWINGS

FIG. 23 is a left side view of a main frame, a swing arm, and a rear suspension of a conventional example.

DETAILED DESCRIPTION OF THE PREFERRED EMBODIMENTS

The First Embodiment of the Invention

The first embodiment of the present invention will be described with reference to FIGS. 1 to 11. For convenience of the description, the moving direction of a vehicle is the "front" of the vehicle, and the right-left direction seen from a riding rider is the "right-left direction" of the vehicle.

(The Entire Configuration of the Vehicle)

Figure 1:
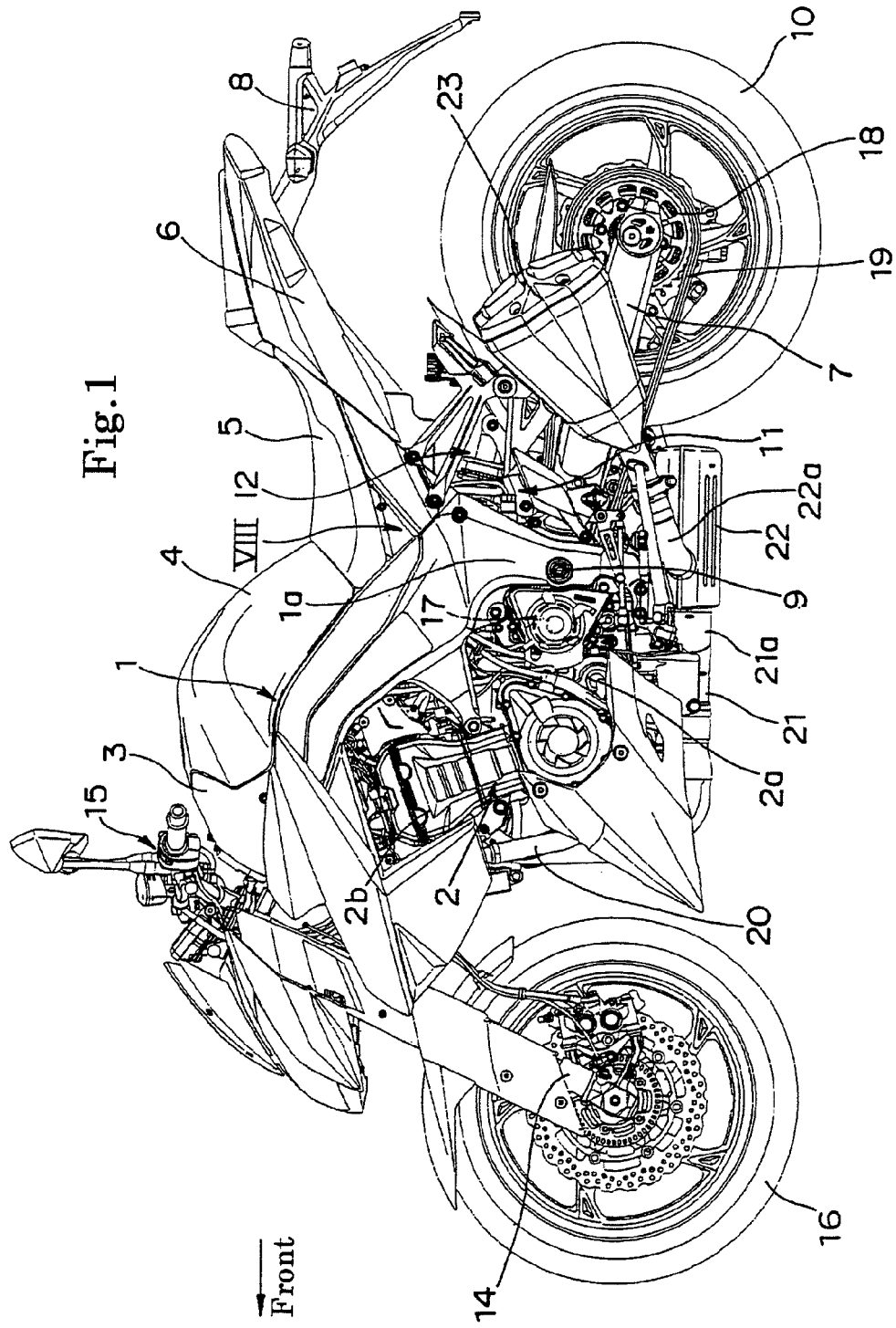
FIG. 1 is a left side view of a motorcycle according to a first embodiment of the present invention.

FIG. 1 is a left side view of the entire motorcycle. An engine 2 is arranged on the lower side of a main frame 1. A suction box 3, a fuel tank 4, and a seat 5 are arranged on the upper side of the main frame 1 in this order from the front. A swing arm 7 is rotatably supported by a swing arm bracket portion 1a provided at the rear lower end of the main frame 1 via a pivot portion (swing axial support portion) 9. A seat rail or rear frame (not shown), and a rear fender 6, which extend rearwardly, are fixed to the upper end of the rear end of the main frame 1. A flap 8 is provided at the rear end of the rear fender 6.

The swing arm 7 extends rearwardly from the pivot portion 9, and is swingable in the up-down direction about the pivot portion 9. A rear wheel 10 is rotatably supported by a rear axle provided at the rear end of the swing arm 7. The upper surface in the front portion of the swing arm 7 is resiliently supported by the main frame 1 via a link mechanism 11 and a rear suspension (rear shock absorber) 12.

A pair of front forks (only the lower end is shown) 14 having a damper function is steerably supported by the front end of the main frame 1. A steering handle device 15 is provided on a steering shaft (not shown) coupled to the upper ends of the front forks 14. A front wheel 16 is rotatably supported by the lower ends of the front forks 14 via a front axle.

The engine 2 is an inline type four-cylinder engine. An output sprocket 17 is provided on the left side of a crankcase (including a transmission case) 2a of the engine 2. A driving chain 19 is entrained between the output sprocket 17 and a sprocket 18 for rear wheel driving provided on the left side of the rear wheel 10.

(The Configuration of an Exhaust Device)

An exhaust device of the engine 2 has four exhaust pipes 20 connected to exhaust ports for the cylinders opened to the front surface of a cylinder head 2b, an exhaust collecting pipe 21 arranged under the crankcase 2a, an exhaust chamber 22 arranged from the lower space of the swing arm bracket portion 1a to the lower space below the front portion of the swing arm 7, and a pair of right and left exhaust mufflers 23 arranged on the right and left sides of the rear wheel 10.

The exhaust pipes 20, which extend downwardly from the exhaust ports on the front surface of the cylinder head 2 in front of the engine 2, are curved rearwardly in the position near the front lower end of the crankcase 2a, and are attached to the exhaust collecting pipe 21 under the crankcase 2a. The outlet of the rear end of the collecting pipe 21 is connected to an exhaust chamber 22 via an exhaust connecting pipe 21a. The exhaust chamber 22 has exhaust ports on the right and left side surfaces, and the exhaust exits are connected to the right and left exhaust mufflers 23 via exhaust connecting pipes 22a, respectively.

(The Configuration of the Main Frame 1, the Swing Arm 7, the Rear Suspension 12, and the Link Mechanism 11)

Figure 2:
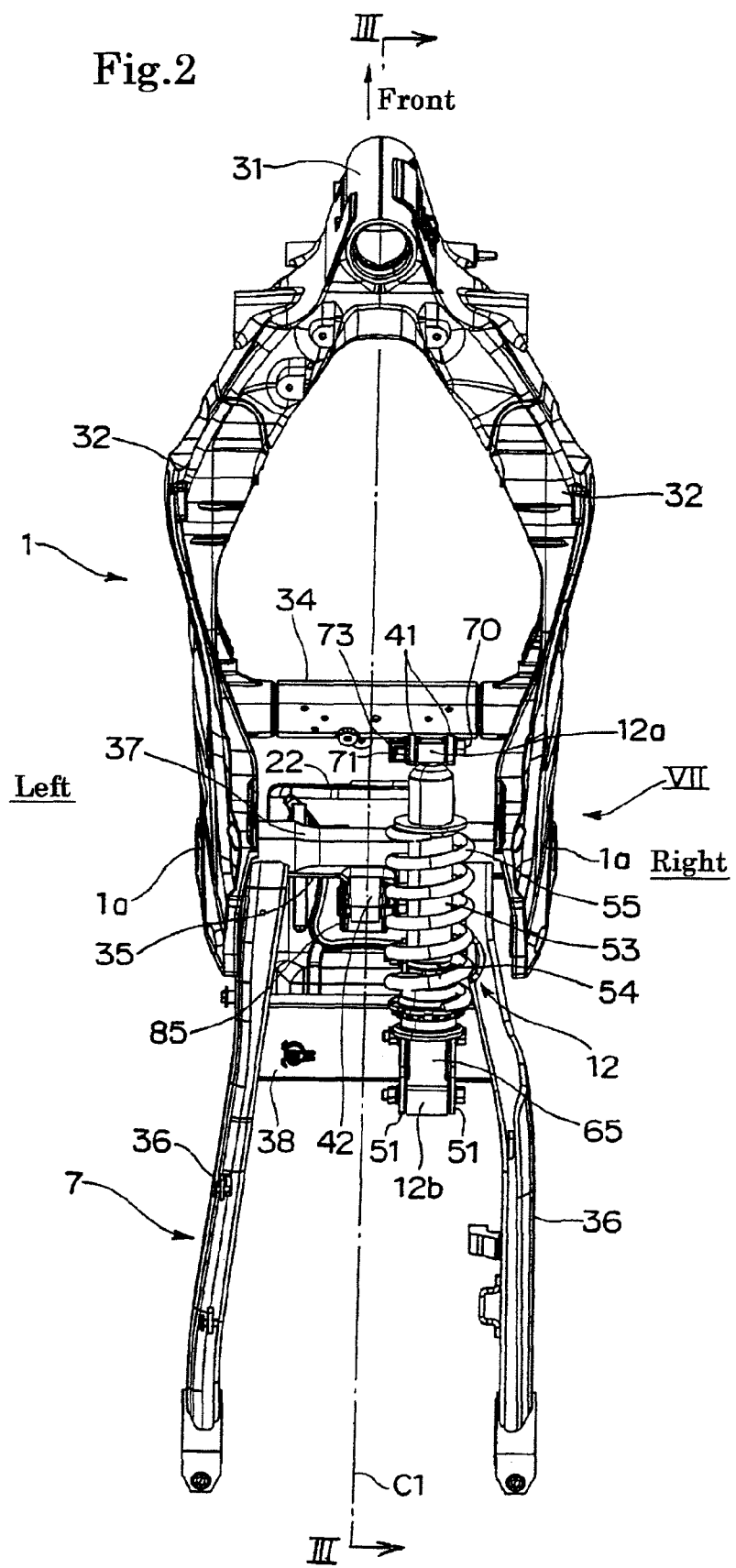
FIG. 2 is a plan view of a main frame, a swing arm, a rear suspension, and an exhaust chamber of the motorcycle of FIG. 1.
Figure 3:
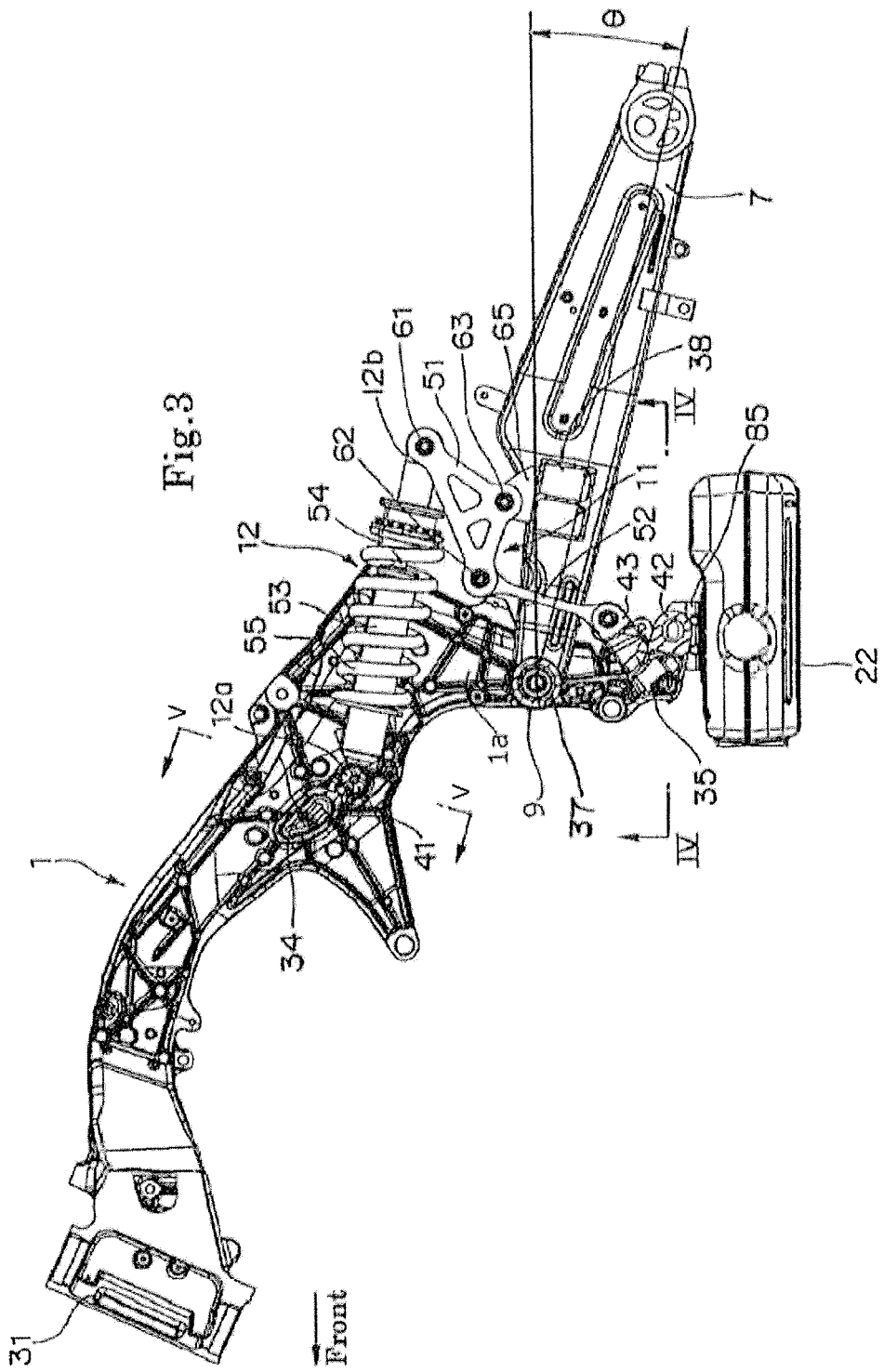
FIG. 3 is a cross-sectional view taken along line III-III of FIG. 2.
Figure 4:
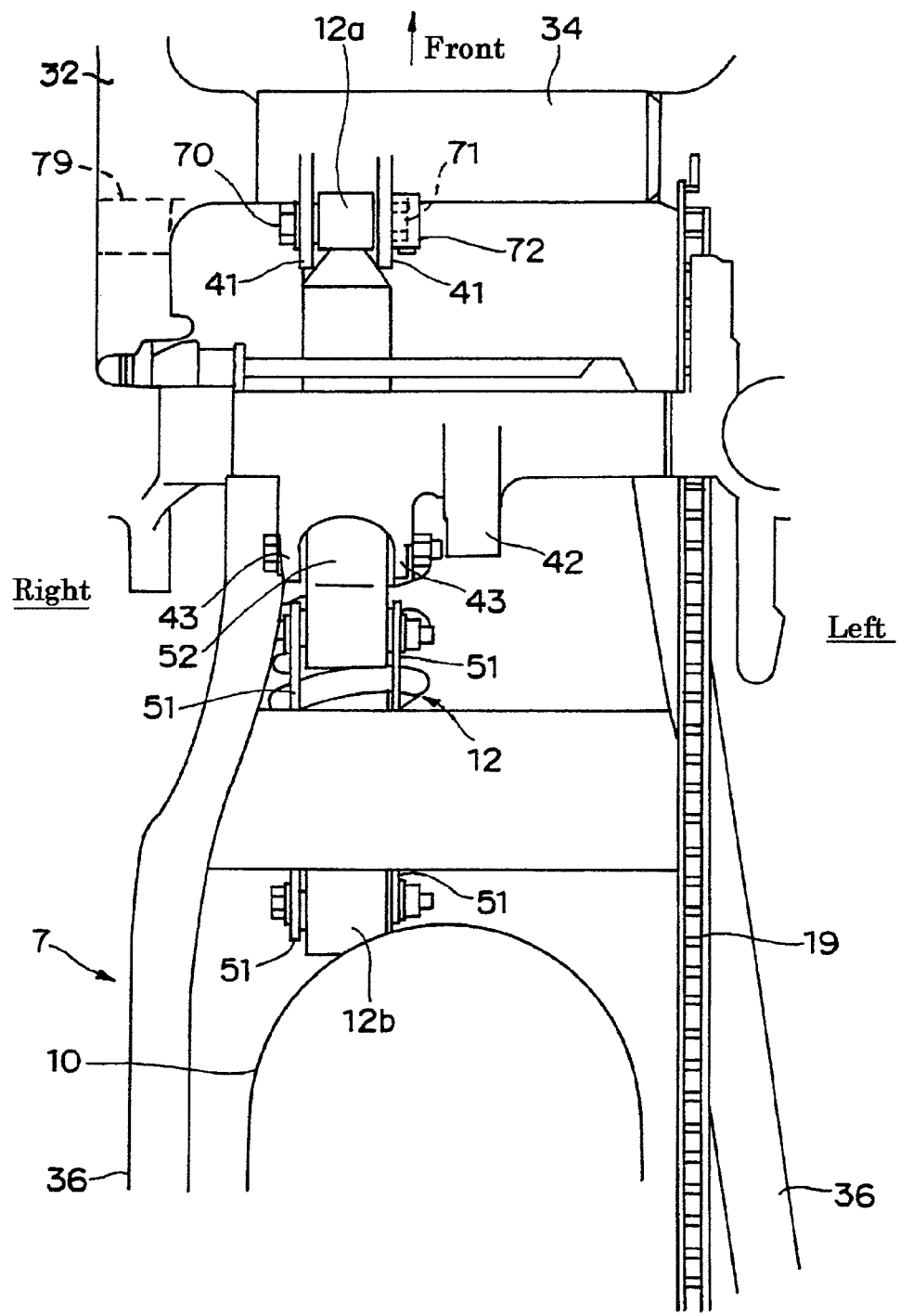
FIG. 4 is an enlarged cross-sectional view taken along line IV-IV of FIG. 3.

FIG. 2 is a plan view of the main frame 1, the swing arm 7, and the rear suspension 12. FIG. 3 is a cross-sectional view taken along line III-III of FIG. 2. FIG. 4 is a cross-sectional view taken along line IV-IV of FIG. 3. In FIG. 2, the main frame 1 integrally has a pair of right and left frame members 32 extending rearwardly from a head pipe portion 31, and an upper cross member 34 and a lower cross member 35 connecting between the right and left frame members 32. As shown in FIG. 3, the upper cross member 34 is arranged in the position slightly rearward of the center in the front-rear direction of the main frame 1. The upper cross member 34 is integrally formed with a suspension attaching portion 41 for rotatably attaching a front end (boss portion) 12a of the rear suspension 12. The lower cross member 35 is provided at the lower end of the swing arm bracket portion 1a. The lower cross member 35 is integrally formed with an exhaust chamber attaching portion 42 for attaching the exhaust chamber 22, and a tie rod attaching portion 43 for supporting a tie rod 52 of the link mechanism 11.

As shown in FIG. 2, the swing arm 7 has a pair of right and left arm members 36, a rotation boss portion 37 coupling the front ends of the arm members 36, and a coupling member 38 coupling the arm members 36 in the position forwardly from the center position of the arm members 36 in the front-rear direction. In FIG. 3, the swing arm 7 is inclined slightly downwardly toward the rear side in a non-riding state. An inclination angle θ with respect to the horizontal plane is set to e.g., about 5° to 10°, but, of course, can exceed 10° according to function.

In FIG. 2, the rear suspension 12 is arranged in the position which is off-center rightwardly from a vehicle width centerline C1, that is, in the position which is off-center to the opposite side of the driving chain arranging side. The rear suspension 12 has a known configuration as a shock absorber, includes a cylinder 53 storing an operating fluid, a rod 54 fitted in the cylinder 53 so as to be movable in the cylinder length direction, and a coil spring 55 arranged on the outer circumferential side of the cylinder 53 and the rod 54. The rear suspension 12 can extend and contract in the length direction against the resilient force of the coil spring 55 and the operating fluid pressure, and absorbs an impact applied to the rear wheel 10.

Although described later in detail, the rear suspension 12 has the front end 12a rotatably connected to the suspension attaching portion 41 of the upper cross member 34 by a bolt 70 and a nut 71, and as shown in FIG. 3, is arranged above the swing arm 7 so as to extend substantially horizontally in the front-rear direction. In the embodiment, the rear suspension 12 extends rearwardly so as to be inclined slightly rearwardly downwardly in substantially parallel with the swing arm 7, and has a rear end 12b rotatably connected to a rear end axial support portion (a first axial support portion) 61 of a suspension arm 51 of the link mechanism 11.

In FIG. 3, the link mechanism 11 includes the triangular suspension arm 51, and the tie rod 52. The suspension arm 51 has an intermediate axial support portion 63 in the front-rear direction rotatably supported by an arm attaching portion 65 provided on the upper surface of the coupling member 38 of the swing arm 7 via a bearing, and a front end axial support portion (a second axial support portion) 62 rotatably connected to the upper end of the tie rod 52 via a pin. The tie rod 52 extends downwardly from the front end axial support portion 62 of the suspension arm 51, and is rotatably supported by the tie rod attaching portion 43 provided at the lower end of the swing arm bracket portion 1a via a pin.

Figure 5:
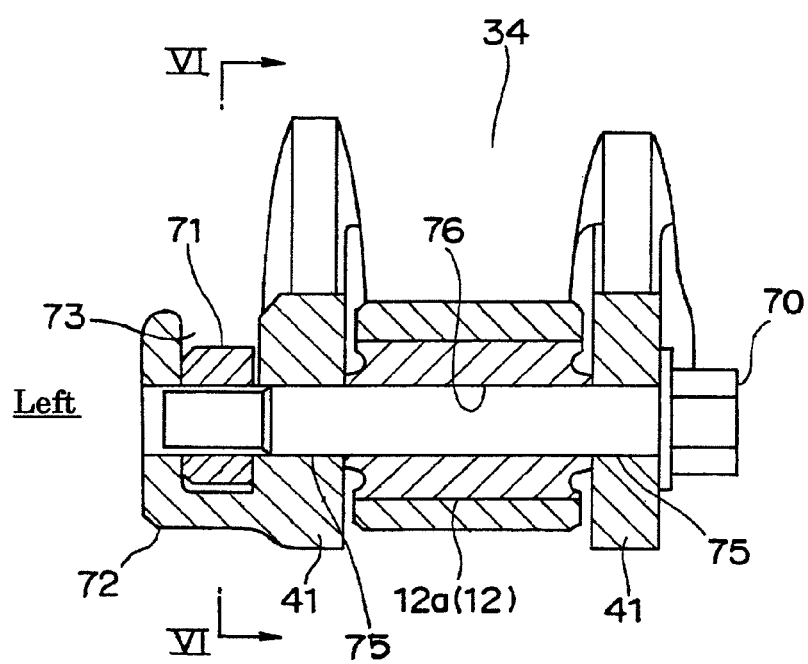
FIG. 5 is an enlarged cross-sectional view taken along line V-V of FIG. 3.
Figure 6:
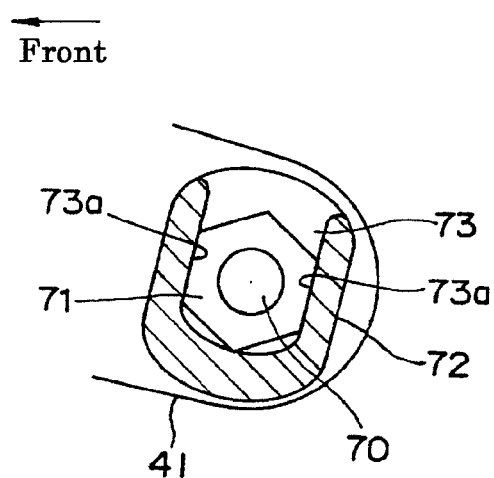
FIG. 6 is a cross-sectional view taken along line VI-VI of FIG. 5.

FIG. 4 is an enlarged cross-sectional view taken along line IV-IV of FIG. 3. FIG. 5 is an enlarged cross-sectional view taken along line V-V of FIG. 3. FIG. 6 is a cross-sectional view taken along line VI-VI of FIG. 5, and shows the detail of the attaching configuration of the front end 12a of the rear suspension 12.

In FIG. 4, the tie rod 52 of the link mechanism 11 includes one thick plate member widely formed in the right-left direction, and the suspension arm 51 includes a pair of right and left plate-like members which are coupled to the right and left sides of the tie rod 52.

The rear suspension attaching portion 41 formed on the upper cross member 34 includes a pair of right and left plate-like portions. The front end 12a of the rear suspension 12 is fitted between these plate-like portions and is rotatably supported by the bolt 70 and the nut 71. A nut engaging and holding portion 72 engaging the nut 71 in the rotation prevention state is integrally formed in the left plate-like portion of the suspension attaching portion 41, that is, in the plate-like portion on the opposite side of the rear suspension off-center side.

In FIG. 5, the bolt 70 for attaching the rear suspension is inserted from the right side of the rear suspension attaching portion 41 through a bolt insertion hole 75 of the right plate-like portion, a bolt insertion hole 76 at the front end 12a of the rear suspension 12, and the bolt insertion hole 75 of the left plate-like portion, and the nut 71 is inserted into a pocket 73 of the nut engaging and holding portion 72. The left end of the bolt 70 is screwed into the nut 71. The nut 71 is non-rotatably positioned by the nut engaging and holding portion 72 so as to be concentric with the bolt insertion hole 75.

In other words, in FIG. 6, a pair of front and rear planes for engagement 73a parallel with each other are formed on the inner circumferential surface of the pocket 73 of the nut engaging and holding portion 72, and the nut 71 in the pocket 73 is prevented from rotating by the pair of planes for engagement 73a and is positioned in the front-rear direction and is also positioned in the up-down direction by the abutment of the lower end of the nut 71 onto the bottom surface of the pocket 73. This can position the nut 71 to be concentric with the bolt insertion holes 75 and 77 of the rear suspension attaching portion 41 and is held in the pocket 73 in the rotation prevention state.

Figure 7:
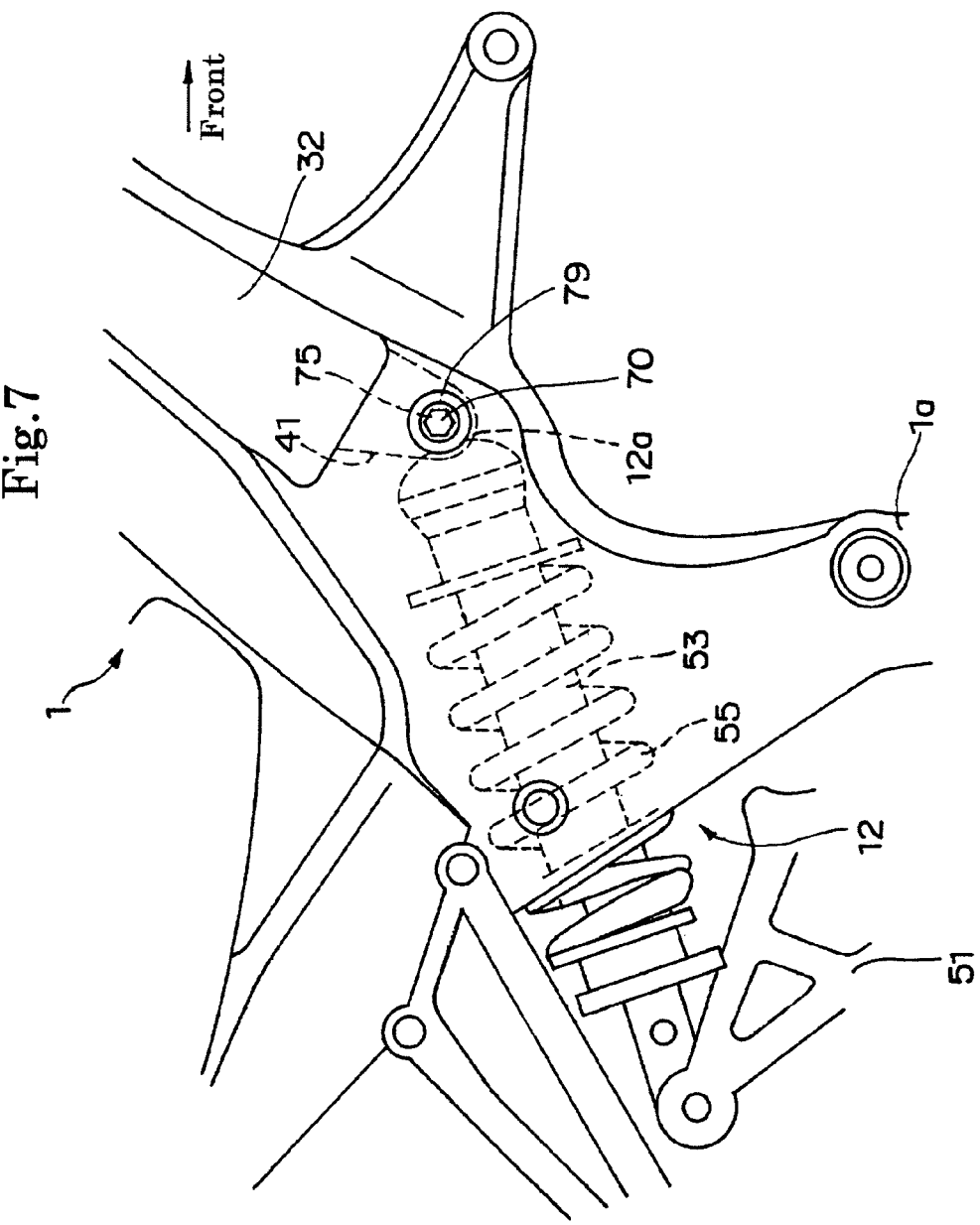
FIG. 7 is an enlarged right side view of an arrow VII portion of FIG. 2.

FIG. 7 is an enlarged right side view of an arrow VII portion of FIG. 2. The right frame member 32 of the main frame 1 has an opening for tool insertion 79 through which the bolt 70 and a tool for rotating the bolt can be inserted. The opening 79 is positioned at a position corresponding to the bolt insertion hole 75 of the rear suspension attaching portion 41, as seen from the side. A tool such as a box type wrench can be inserted through the opening for tool insertion 79 from the outside (right) of the vehicle to rotate the bolt 70. This arrangement allows the rear suspension 12 to be easily attached and detached even when the rear suspension attaching portion 41 is arranged in the intermediate portion in the up-down direction inside the main frame 1. In addition, the rear suspension attaching portion 41 is arranged near the lower edge of the main frame 1 so that the rear suspension 12 can be arranged as downwardly as possible. Further, the opening for tool insertion 79 is covered by a resin cap (not shown).

(The Arrangement of a Battery 80)

Figure 8:
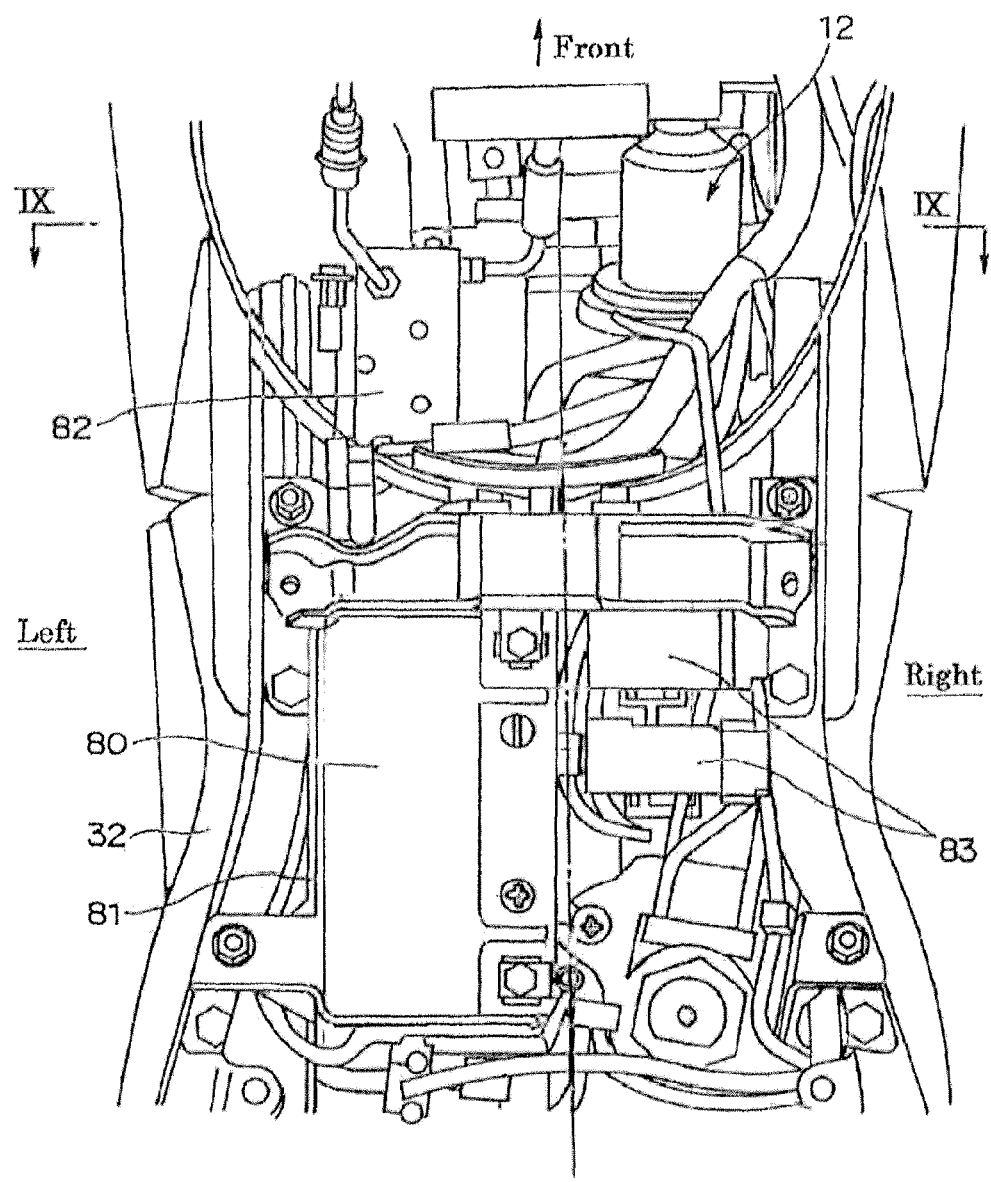
FIG. 8 is an enlarged plan view of an arrow VIII portion of FIG. 1 showing the state that a seat and a fuel tank are detached.
Figure 9:
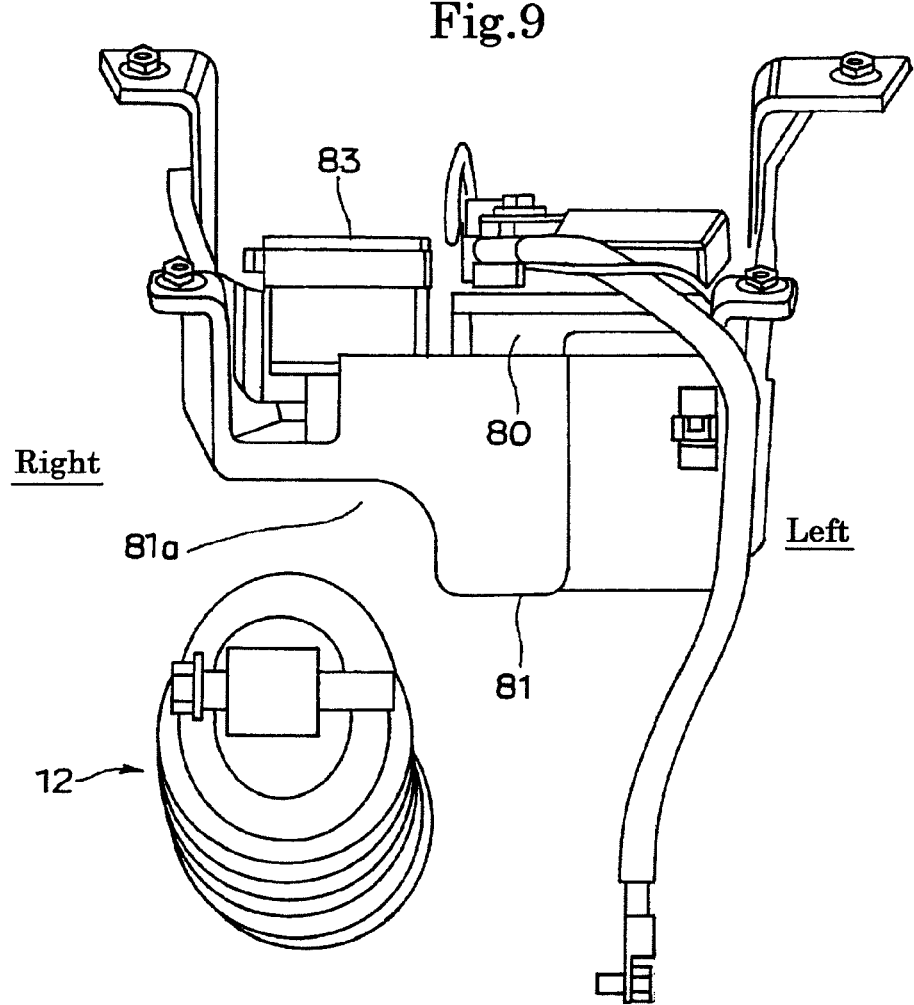
FIG. 9 is a cross-sectional view taken along line IX-IX of FIG. 8 showing the relation between the rear suspension and a battery case.

FIG. 8 is an enlarged plan view of a portion indicated by an arrow VIII in FIG. 1 showing the state in which the seat 4 and the fuel tank 4 are detached. FIG. 9 is a cross-sectional view taken along line IX-IX of FIG. 8 showing the relation between the rear suspension 12 and a battery case 81. In FIG. 8, as described above, as the rear suspension 12 is arranged on the right side with respect to the vehicle width centerline C1, the space on the left side of the vehicle width centerline C1 is largely secured. The incorporated articles such as the battery 80 and an ABS unit 82 for controlling a brake operating fluid are arranged in the left space. The ABS unit 82 is arranged leftwardly of the front half portion of the rear suspension 12. The battery 80 is arranged on the rear side of the ABS unit 82 and leftwardly of the rear half portion of the rear suspension 12.

The battery case 81 extends to the right and left frame members 32 above the rear suspension 12. The battery 80 is mounted on the left portion of the battery case 81. Fuse boxes 83 are mounted on the right side of the battery case 81.

In FIG. 9, the lower surface of the left half of the battery case 81 is located slightly downwardly from the uppermost end position of the rear suspension 12. A recess portion 81a which can accommodate the upper side and the left side of the upper half portion of the rear suspension 12 is formed to the lower surface of the right half portion of the battery case 81. In other words, the lower surface of the right half portion located immediately above the rear suspension 12 is formed to be higher than the lower surface of the left half portion so that the rear suspension 12 swinging in the up-down direction together with the swing arm 7 cannot interfere with the battery case 81.

(The Attaching Configuration of the Exhaust Chamber 22)

Figure 10:
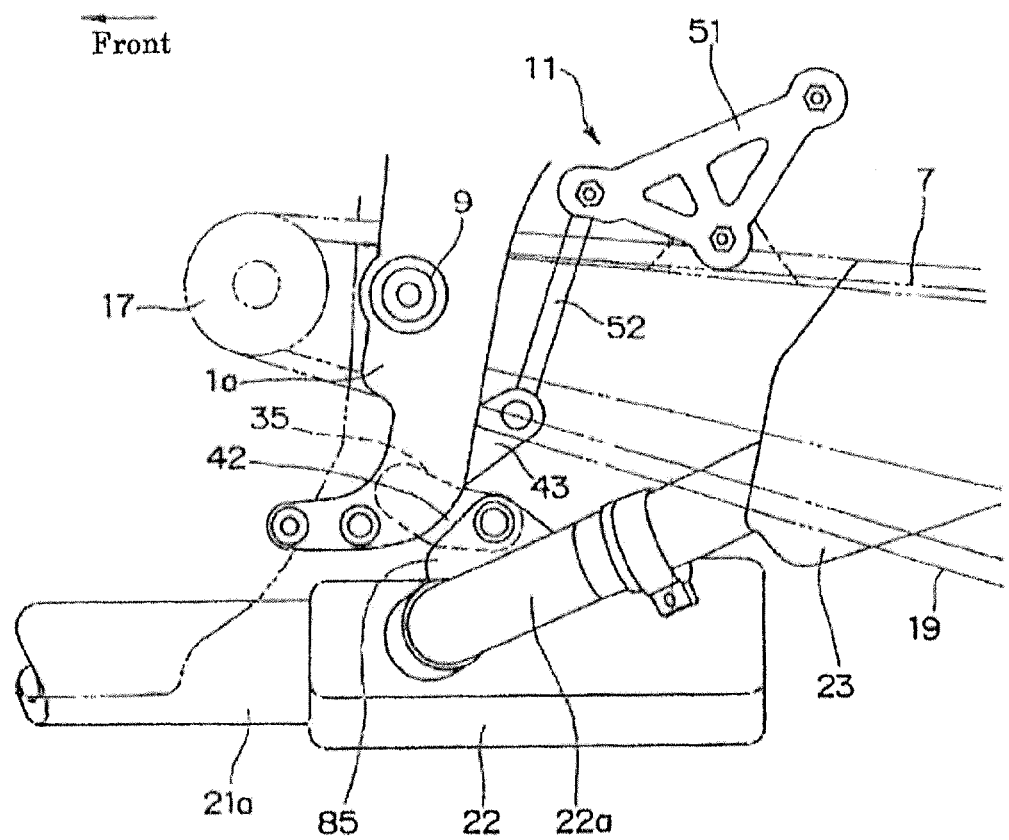
FIG. 10 is an enlarged left side view of the exhaust chamber and its vicinity.
Figure 11:
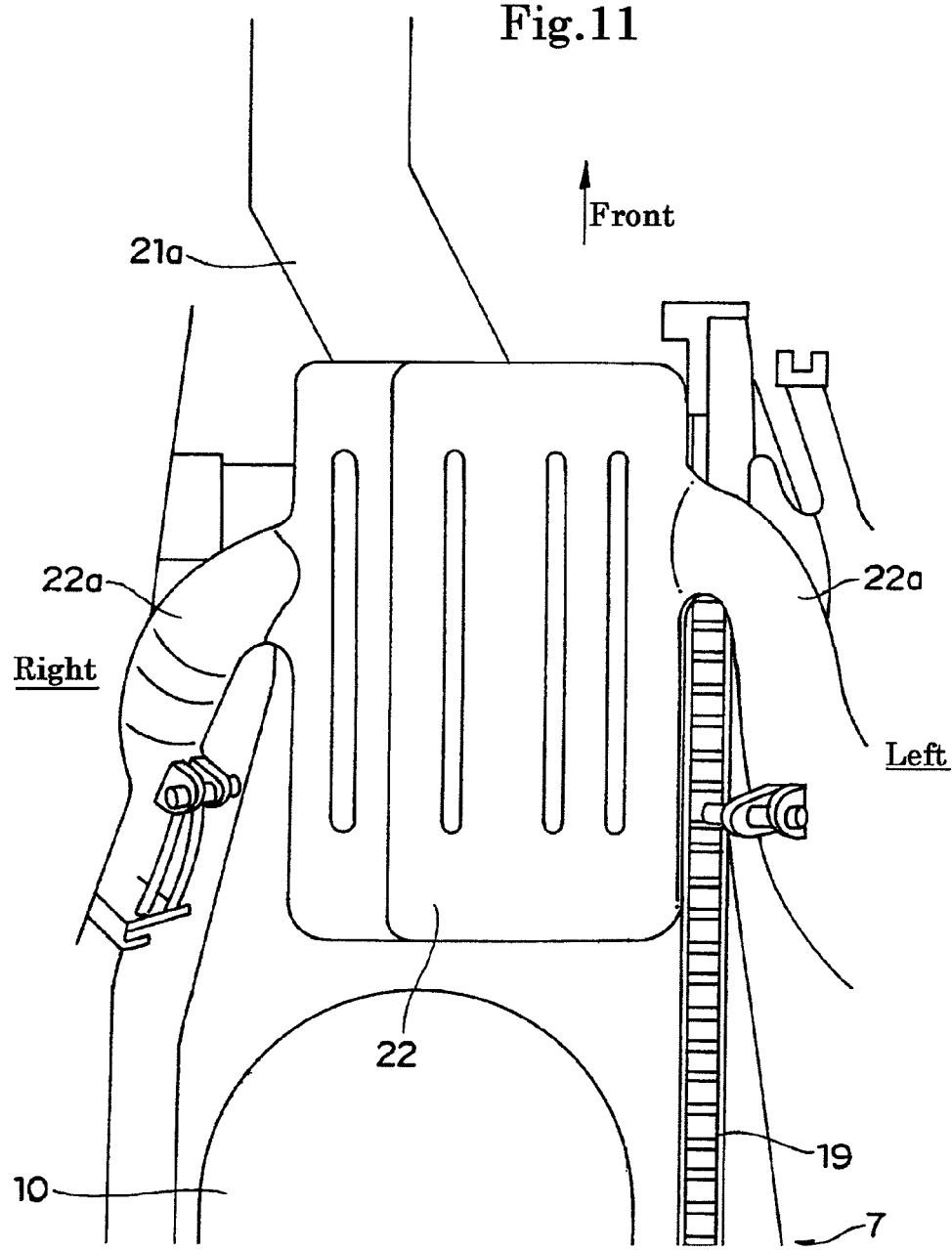
FIG. 11 is a bottom view of FIG. 10.

FIG. 10 is an enlarged left side view of the exhaust chamber 22. FIG. 11 is an enlarged bottom view of the exhaust chamber 22. In FIG. 10, a pair of right and left attaching sections 85 is formed on the upper surface of the exhaust chamber 22. The attaching sections 85 are attached to the chamber attaching portion 42 of the lower cross member 35 by a pin. In FIG. 11, the exhaust chamber 22 has a substantially rectangular shape which is long in the front-rear direction, and as shown in FIG. 10, is formed to have a flat shape which is short in the up-down direction, as seen from the side. In addition, the exhaust chamber 22 is arranged below the pivot portion 9 and the swing arm 7.

In addition, as shown in FIG. 2, the chamber attaching portion 42 of the lower cross member 35 is located on the vehicle width centerline C1.

(The Operation Effects of the First Embodiment)

(1) When a large load is applied to the rear wheel at the time of cornering (or acceleration or deceleration), in FIG. 1, the swing arm 7 is swung relatively upwardly with respect to the vehicle body together with the rear wheel 10, and compresses the rear suspension 12 forwardly via the link mechanism 11 of FIG. 3 to absorb an impact. At this time, the rear suspension 12 is arranged so as to extend in the substantially front-rear direction. The load applied to the rear suspension 12 forwardly is transmitted to the front fork 14 of FIG. 1 via the main frame 1 and increases the load pressing the front wheel 16 to the ground. This can increase the grip force of the front wheel 16 to the ground and perform stable cornering.

(2) The rear suspension 12 is also moved relatively upwardly with respect to the vehicle body together with the swing arm 7. As shown in FIG. 9, the recess portion 81a is formed in the right portion of the battery case 81 located above the rear suspension 12 so that the rear suspension 12 cannot interfere with the battery case 81.

(3) When the rear suspension 12 is assembled and disassembled, as shown in FIGS. 5 and 6, the nut 71 is engaged and held by the nut engaging and holding portion 72 so as not to be rotatable and so as to be matched with the bolt insertion hole 75 of the suspension attaching portion 41. The operator can insert a wrench for bolt rotation from the opening for tool insertion 79 of the right frame member 32 shown in FIG. 7, and rotate the bolt 70 without engaging the nut 71, in particular, by the tool. Therefore, the operator can easily assemble and disassemble the rear suspension 12 without detaching the seat 5 and the fuel tank 4 of FIG. 1. Further, the opening for tool insertion 79 is formed in the frame member 32 on the side in which the rear suspension 12 is off-center (right side) so that even a short tool can access the bolt 70. Thus, the convenience in the assembling and disassembling operations can be improved.

(4) As shown in FIG. 3, the entire rear suspension 12 is arranged in the position above the swing arm 7 so as to extend in the substantially front-rear direction, and the suspension arm 51 of the link mechanism 11 is arranged on the upper side of the swing arm 7. The lower space of the swing arm 7 and the lower space of the swing arm bracket portion 1a can be effectively used for arranging the exhaust chamber 22 without reducing the ground clearance. This can increase the volume of the exhaust chamber 22, make the size of the vehicle in the front-rear direction compact, and prevent the size of the vehicle in the up-down direction from being increased.

In addition, the rear suspension attaching portion 41 is located below the upper edge of the main frame 1. This can arrange the rear suspension 12 downwardly as compared with when the rear suspension attaching portion 41 is formed in the upper portion of the main frame so that other equipment mounted on the vehicle can be easily mounted in the upper space of the rear suspension 12. Further, the rear suspension attaching portion 41 is formed below the upper cross member 34 so that the rear suspension 12 can be arranged more downwardly.

(5) As shown in FIG. 8, the rear suspension 12 is arranged on the right side of the vehicle width centerline C1, and the heavy battery 80 and ABS unit 82 are arranged in the space secured on the left side thereof. They can be effectively used without increasing the right-left width of the vehicle. The right-left weight balance can also be maintained. In addition, the exhaust chamber 22 and the tie rod 52 are attached to the attaching portions 42 and 43 formed on the same lower cross member 35. As compared with when the attaching portions 42 and 43 are formed individually, the number of components can be reduced.

The Second Embodiment

FIGS. 12 to 22 show the second embodiment of the present invention. The basic configuration of the entire vehicle and the basic configuration and feature of each portion are the same as in the first embodiment except for the shapes of the fuel tank 4, the swing arm 7, the rear suspension 12, and the rear fender 6, and the number of the openings for tool insertion. Components having the same name as the first embodiment are indicated by same reference numerals. The overlapped described contents are omitted or are briefly described.

Figure 12:
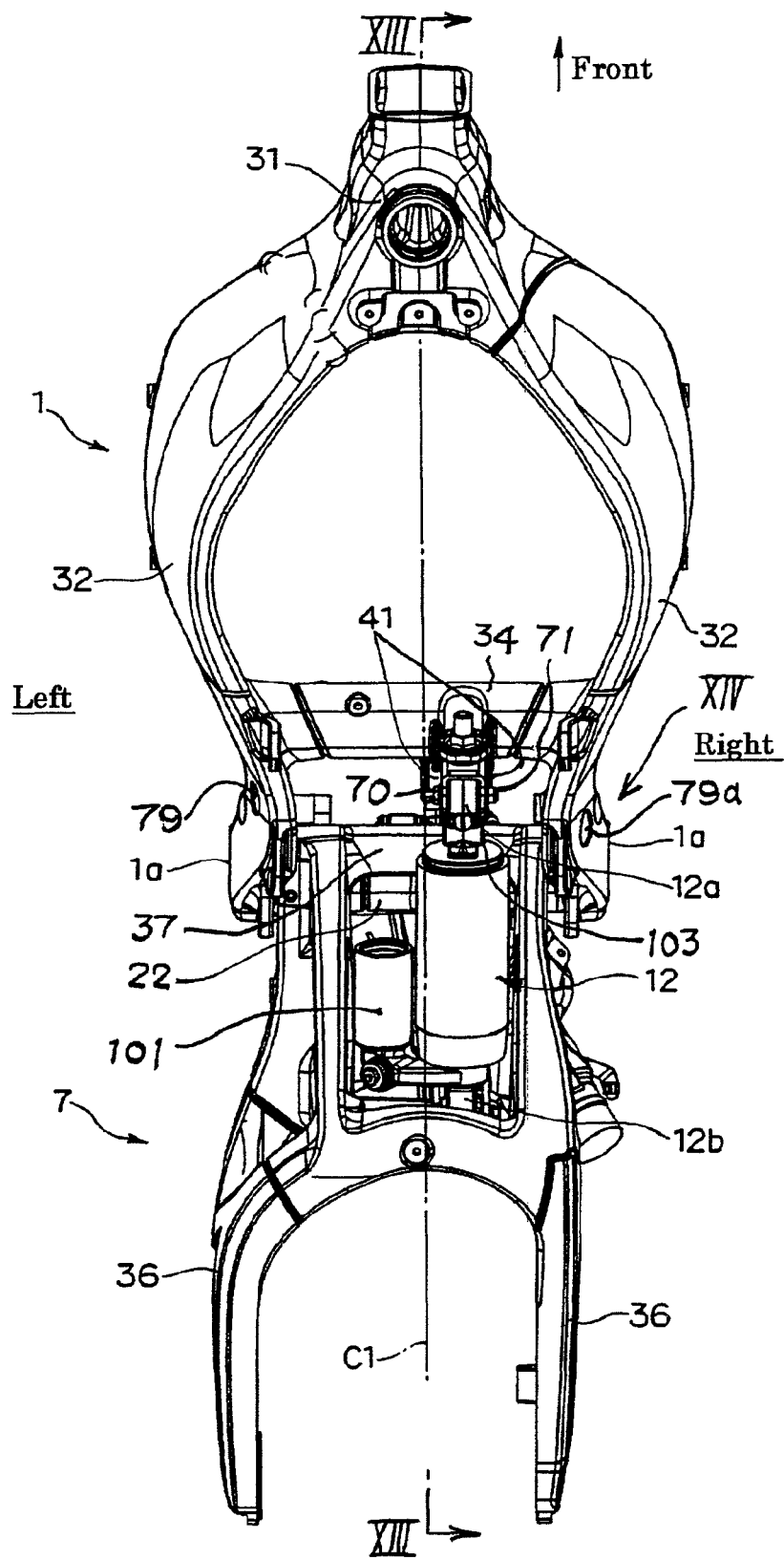
FIG. 12 is a plan view of the main frame, the swing arm, the rear suspension, and the exhaust chamber of the motorcycle according to a second embodiment of the present invention.
Figure 13:
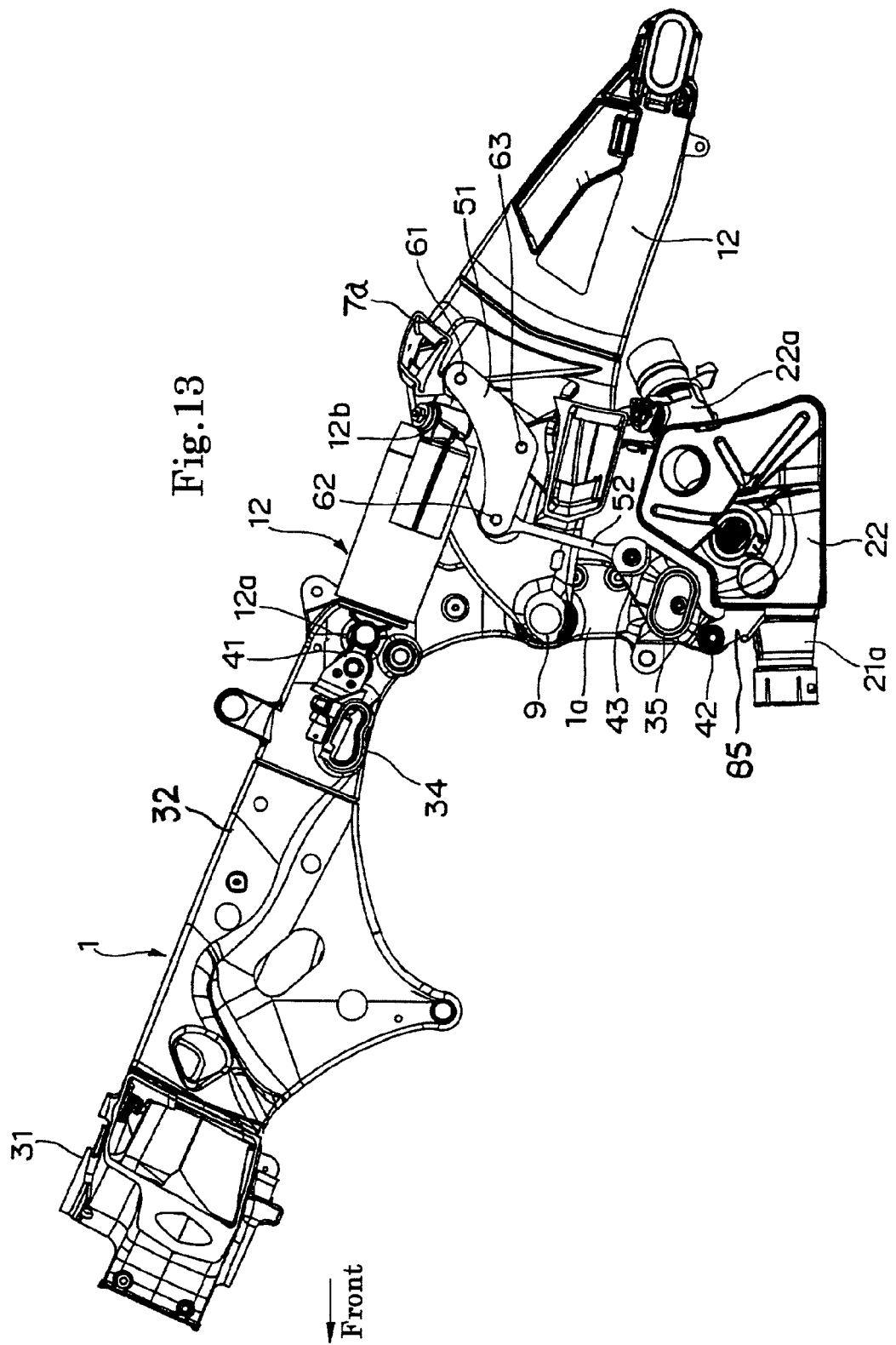
FIG. 13 is a cross-sectional view taken along line XIII-XIII of FIG. 12.
Figure 14:
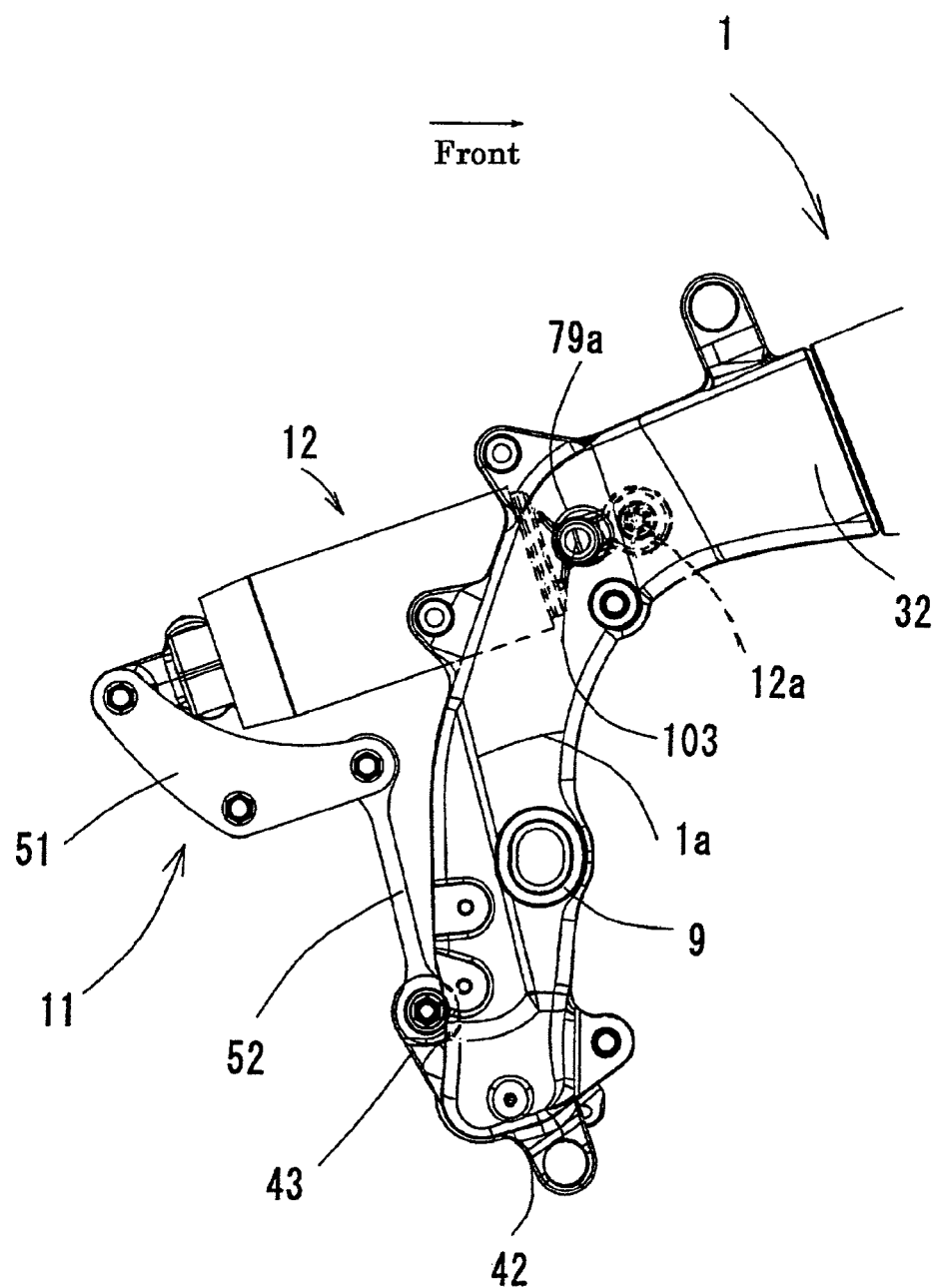
FIG. 14 is an enlarged right side view of an arrow XIV portion of FIG. 12.

FIG. 12 is a plan view showing the main frame 1, the swing arm 7, and the rear suspension 12. FIG. 13 is a cross-sectional view taken along line XIII-XIII of FIG. 12. FIG. 14 is an enlarged right side view of an arrow XIV portion of FIG. 12.

In FIG. 13, to improve the rigidity, a triangular stabilizer portion 7a protruding upwardly is integrally formed with the swing arm 7 on the upper surface of the swing arm 7.

As in the first embodiment, the rear suspension 12 has the front end 12a rotatably connected to the suspension attaching portion 41 provided on the upper cross member 34 of the main frame 1, extends rearwardly from the suspension attaching portion 41 so as to be substantially parallel with the swing arm 7 in the position above the swing arm 7, and has the rear end 12b rotatably connected to the rear end axial support portion (the first axial support portion) 61 of the suspension arm 51.

In FIG. 12, the bolt 70 for supporting the front end 12a of the rear suspension 12 is inserted from the left side of the rear suspension attaching portion 41. Therefore, in this embodiment, the opening for tool insertion 79 for rotating the bolt 70 is formed in the left frame member 32.

In addition, the rear suspension 12 of this embodiment has a reserve tank 101 for supplying an operating fluid, and on the right side surfaces at the front and rear ends, adjusting screws (only the front end side is shown) 103 for adjusting an attenuation pressure on the extension side and the compression side. An opening for tool insertion 79a for the adjusting screw is formed in the right frame member 32 so that the adjusting screw 103 at the front end can be operated from the right side of the vehicle body. As shown in FIG. 14, the opening for tool insertion 79a is formed in the position corresponding to the adjusting screw 103 at the front end 12a of the rear suspension 12, as seen from the side.

In addition, in this embodiment, as shown in FIG. 12, the rear suspension 12 itself is arranged in the position which is off-center rightwardly from the vehicle width centerline C1. The reserve tank 101 is located on the left side of the vehicle width centerline C1 and is arranged so as to be substantially parallel with the rear suspension 12.

Figure 15:
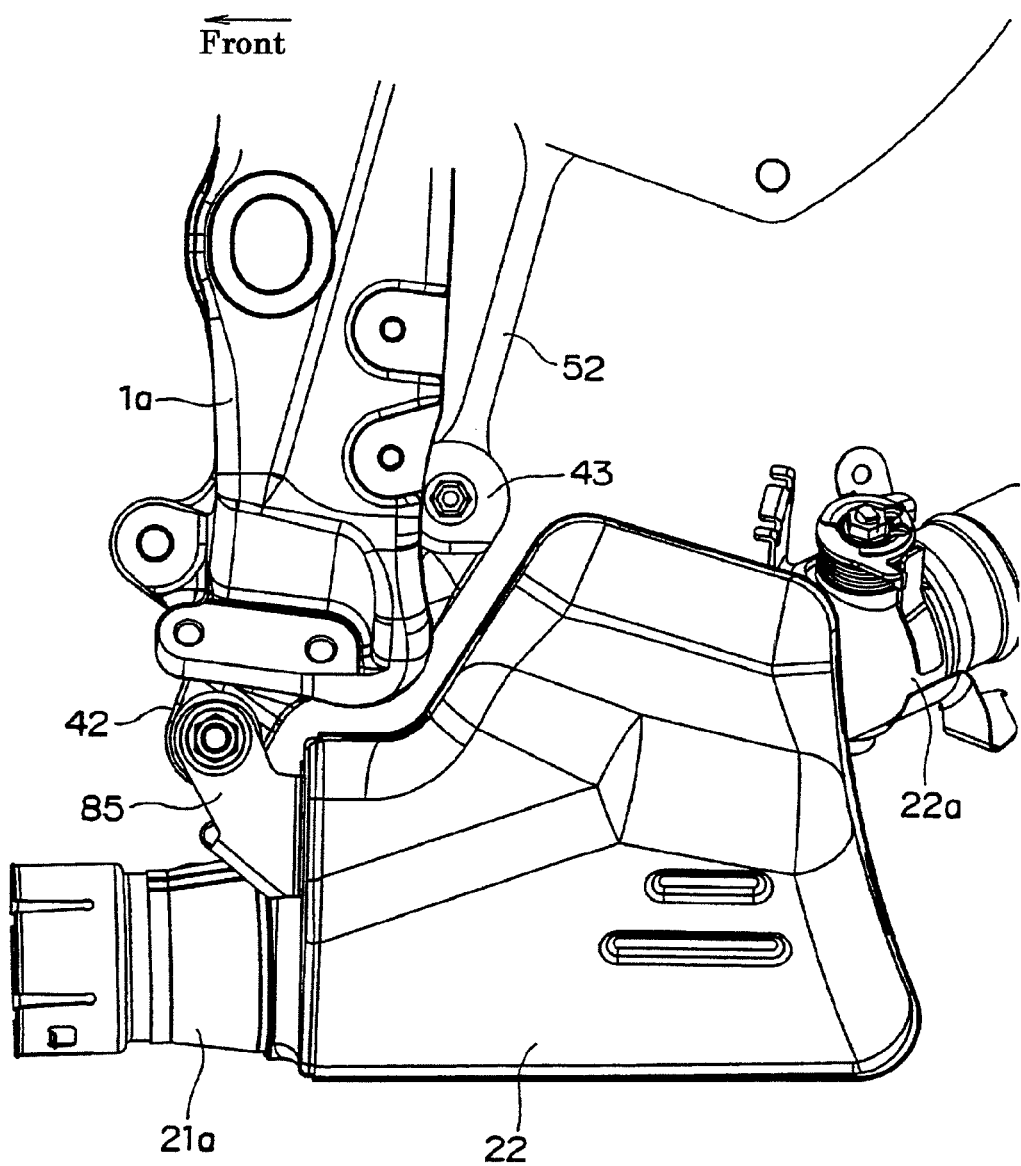
FIG. 15 is an enlarged left side view of the exhaust chamber of FIG. 12.
Figure 16:
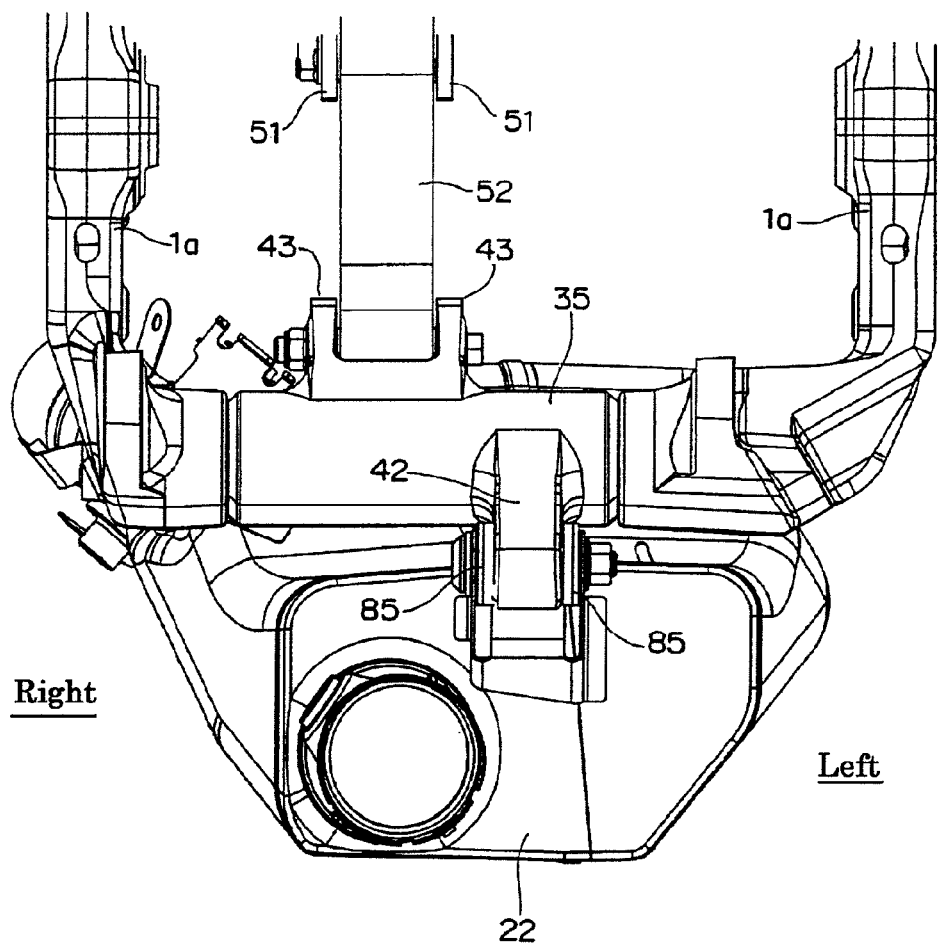
FIG. 16 is a front view of FIG. 15.

FIG. 15 is a left side view of the exhaust chamber 22. FIG. 16 is a front view of FIG. 15. In FIG. 15, the exhaust chamber 22 seen from the side has a front end arranged in the lower space of the swing arm bracket portion 1a of the main frame 1, and abruptly protrudes upwardly toward the lower space of the swing arm 7. As shown in FIG. 13, the rear half portion located in the lower space of the swing arm 7 secures a large volume. The attaching section 85 of the exhaust chamber 22 is formed on the front surface of the exhaust chamber 22, and extends forwardly upwardly so as to be supported by the exhaust chamber attaching portion 42 at the lower end of the swing arm bracket portion 1a.

In FIG. 16, in the motorcycle of this embodiment, the exhaust muffler 23 is arranged only on the right side of the vehicle body. Therefore, the exhaust connecting pipe 22a is provided only on the right side surface of the exhaust chamber 2.

Figure 17:
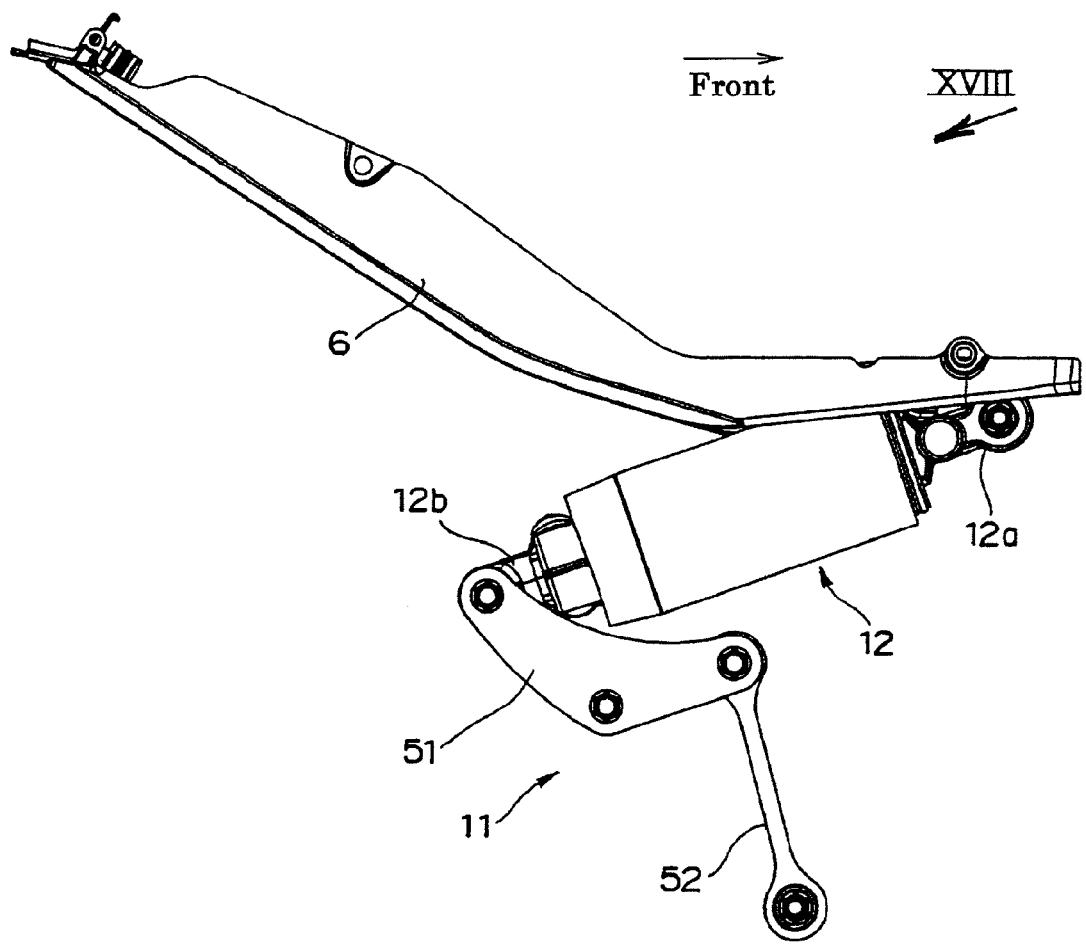
FIG. 17 is a right side view showing the relation between the rear suspension and a rear fender.
Figure 18:
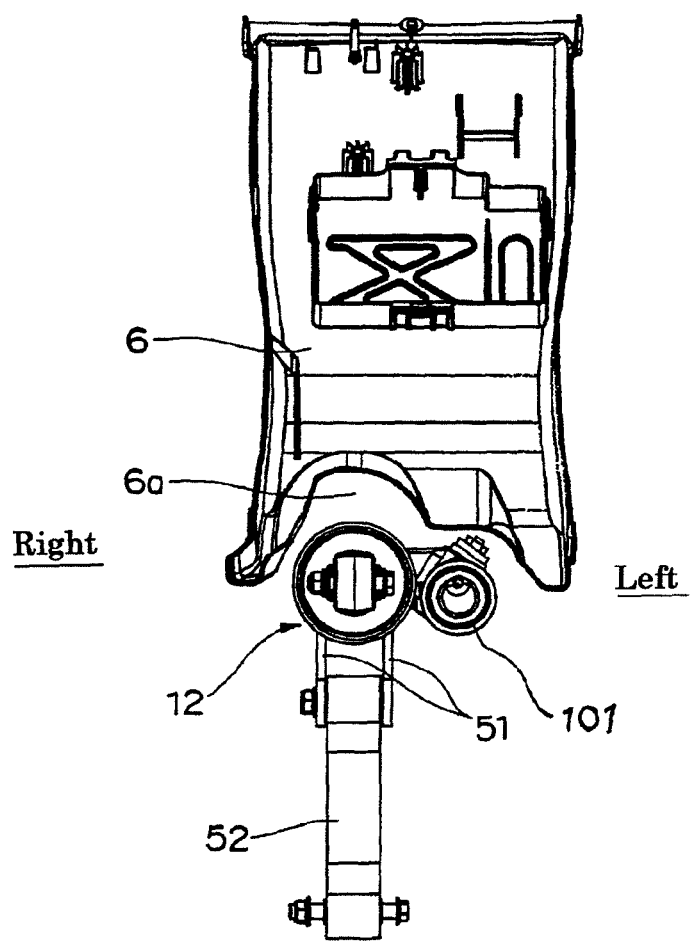
FIG. 18 is a diagram viewed in the direction of arrow XVIII of FIG. 17.

FIG. 17 is a right side view showing the position relation between the rear suspension 12 and the rear fender 6. FIG. 18 is a diagram viewed in the direction of arrow XVIII of FIG. 17 (a diagram seen from the front upper side). In FIG. 17, the rear fender 6 extends rearward from the front position of the front end 12a of the rear suspension 12, covers the upper side of the front portion of the rear suspension 12, and tiltably extends rearward and upwardly from the middle position in the front-rear direction of the rear suspension 12 to cover the rear wheel 10, as shown in FIG. 1.

In FIG. 18, a recess portion 6a having a shape corresponding to the shape of the upper half portion of the rear suspension 12 itself and the shape of the upper half portion of the reserve tank 101 is formed to the lower surface of the front portion of the rear fender 6. This arranges the position of the rear suspension 12 as upwardly as possible in the range not interfering with the rear fender 6.

Figure 19:
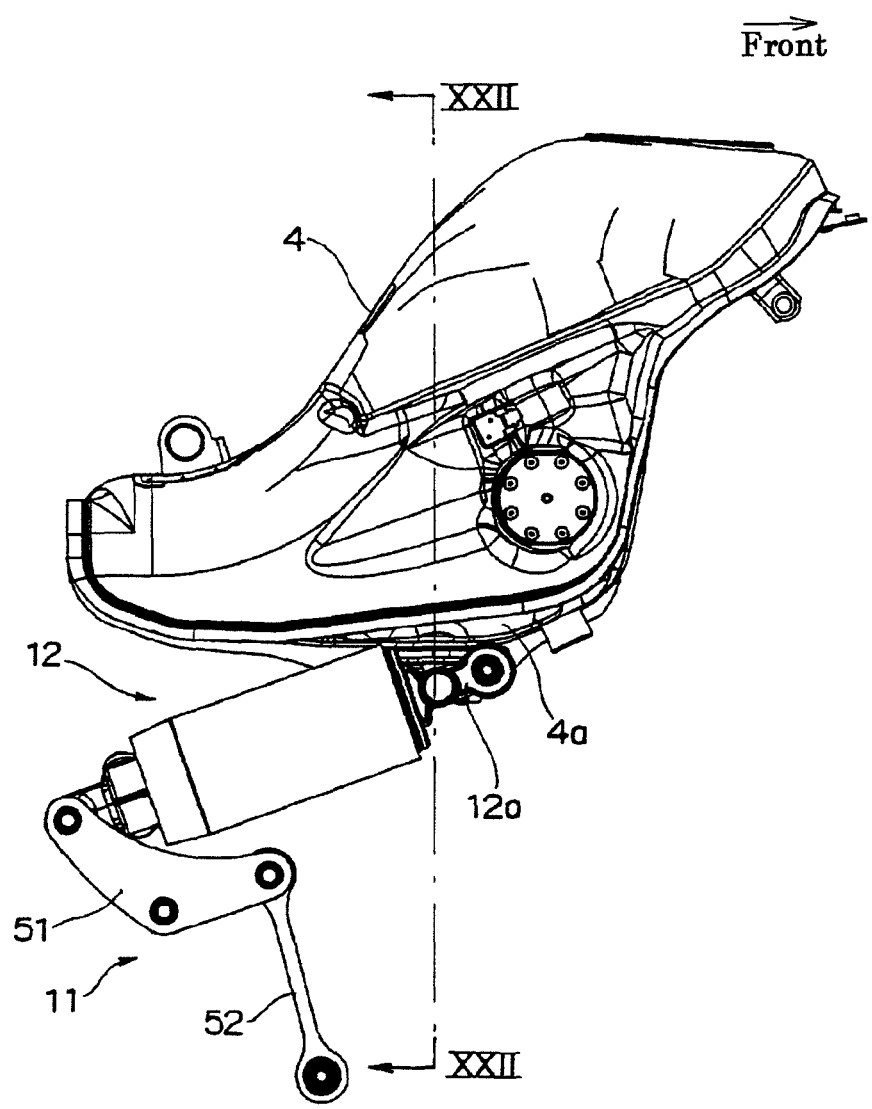
FIG. 19 is an enlarged right side view of the rear suspension and the fuel tank.
Figure 20:
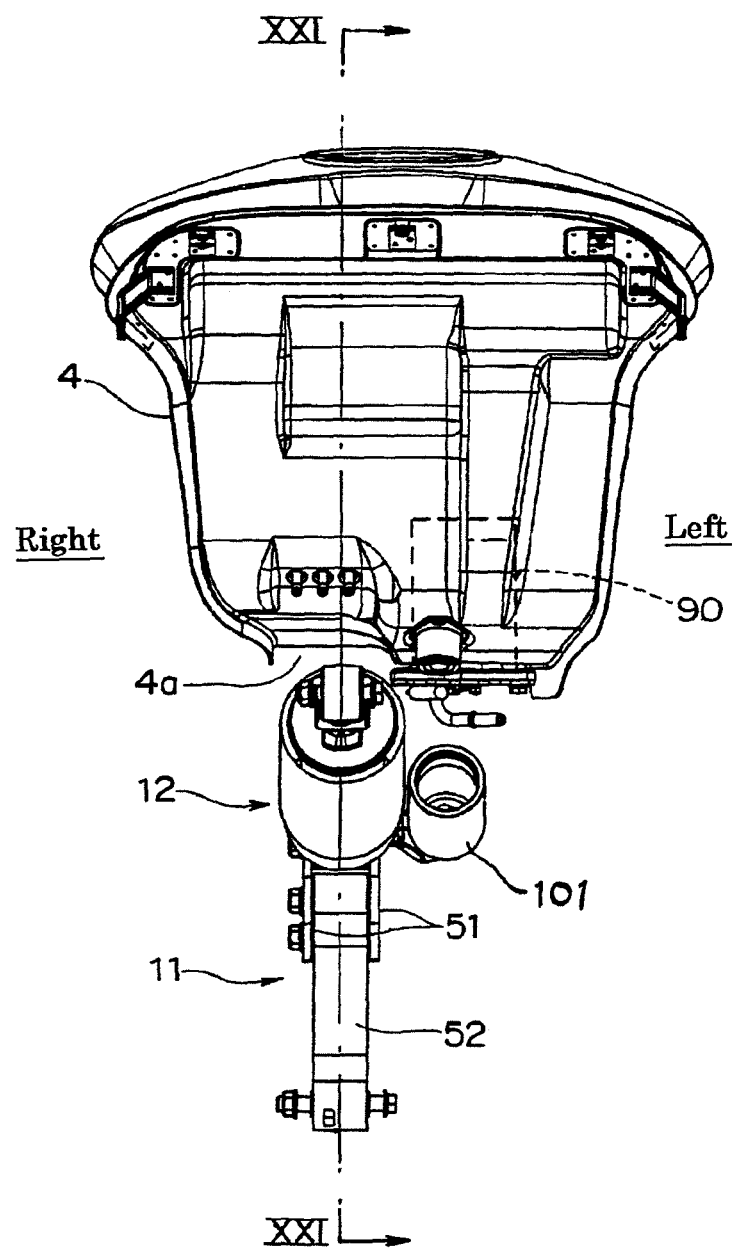
FIG. 20 is a front view of FIG. 19.
Figure 21:
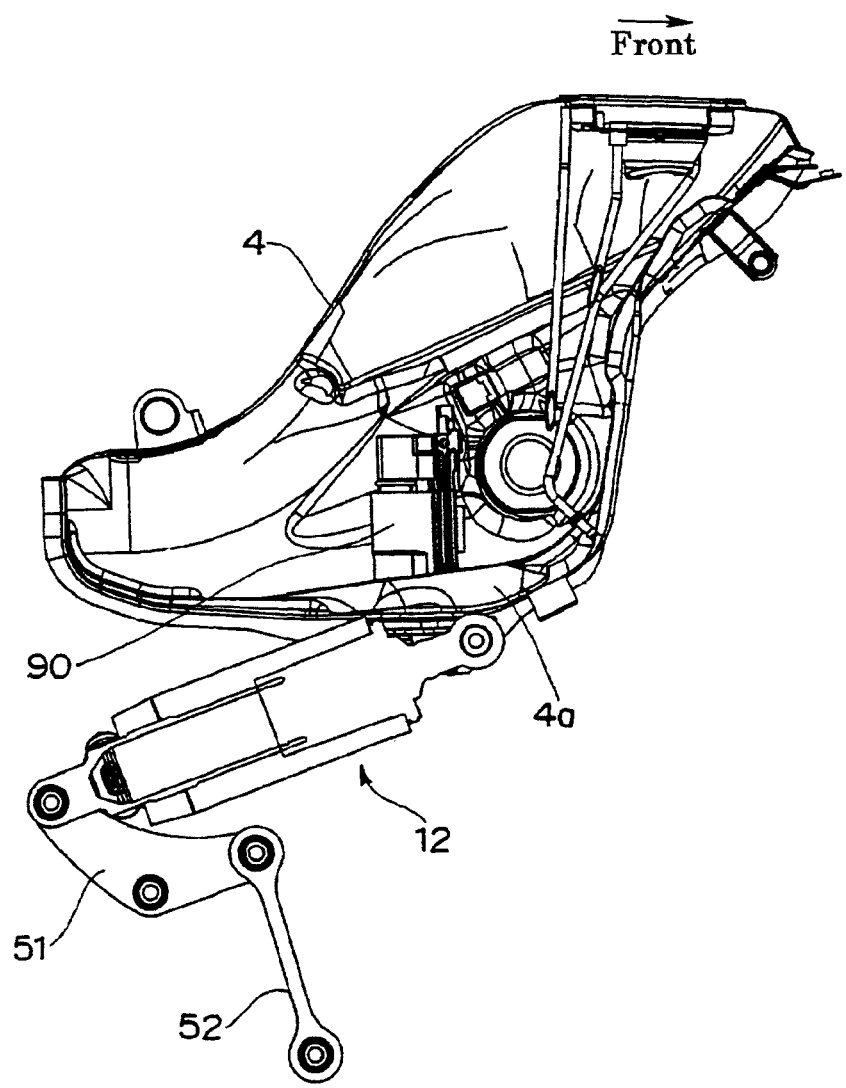
FIG. 21 is a cross-sectional view taken along line XXI-XXI of FIG. 20.
Figure 22:
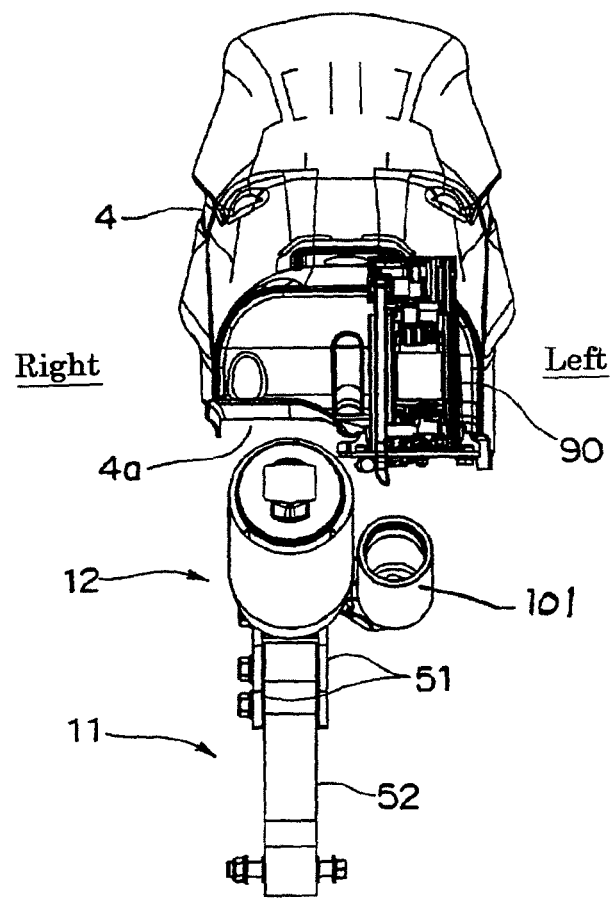
FIG. 22 is a cross-sectional view taken along line XXII-XXII of FIG. 19.

FIG. 19 is a right side view showing the positional relation between the fuel tank 4 and the rear suspension 12. FIG. 20 is a front view of FIG. 19. FIG. 21 is a cross-sectional view taken along line XXI-XXI of FIG. 20. FIG. 22 is a cross-sectional view taken along line XXII-XXII of FIG. 19.

In FIG. 19, the shape of the fuel tank 4 seen from the side extends out and downwardly from the upper portion of the main frame 1 (see FIG. 13) to between the right and left frame members 32 and extends rearward and above the rear suspension 12 at its lower end. In addition, as shown in FIG. 20, the right side portion of the bottom surface of the fuel tank 4 is formed with a recess portion 4a which is recessed upwardly and can accommodate the upper portion of the front portion of the rear suspension 12.

Further, as shown in FIGS. 21 and 22, a fuel pump 90 is provided on the bottom surface of the left half portion of the fuel tank 4, and a fuel suction port provided at the lower end of the fuel pump 90 is opened at the lowest end of the fuel tank formed using the left space of the rear suspension 12.

(The Operation Effects of the Second Embodiment)

According to the second embodiment, in addition to the same operation effects as those of the first embodiment, the following effects are provided.

(1) As shown in FIGS. 12 and 14, the frame member 32 of the main frame 1 is formed with the opening for tool insertion 79a for operating the adjusting screw 103 for adjusting the attenuation pressure of the rear suspension 12, in addition to the opening for tool insertion 79 for fastening the bolt 70. Accordingly, the attenuation pressure of the rear suspension 12 can be adjusted from the side of the vehicle body without detaching the seat 5 and the fuel tank 4. In addition, the opening for tool insertion 79a is formed in the frame member 32 on the off-center side of the rear suspension 12. Accordingly, even a short tool can access the adjusting screw 103. As a result, the convenience in the assembling and disassembling operations can be improved.

(2) As shown in FIGS. 20 to 22, the fuel tank 4 extends out downwardly from between the right and left frame members 32 of the main frame 1 to the left space of the rear suspension 12, and the fuel pump 90 is arranged in the fuel tank 4 so that at least the lower end suction port is opened in the lowest end position of the tank on the left side of the rear suspension 12 or its vicinity. In other words, the left space of the rear suspension 12, arranged so as to be off-center rightwardly from the vehicle width centerline C1, is used as the lower extended volume for the fuel tank 4 and the fuel pump 90. Accordingly, the volume of the fuel tank 4 can be secured while the compact properties of the vehicle are maintained. In addition, at the time of acceleration and deceleration, even in the state in which fuel is moved in the fuel tank 4, air suction of the fuel pump 90 can be prevented.

(3) As shown in FIGS. 17 and 18, the recess portion 6a which can cover the upper side and the side of the upper half portion of the rear suspension 12 is formed to the bottom surface of the rear fender 6. Accordingly, even when the rear suspension 12 is arranged above the swing arm 7 so as to extend in the substantially front-rear direction, the compact size of the vehicle in the up-down direction can be maintained.

OTHER EMBODIMENTS (1) The rear suspension 12 can be off-center leftwardly from the vehicle width centerline C1, but as the driving chain 19 is typically arranged leftwardly of the swing arm 7 in the motorcycle, the rear suspension 12 is preferably arranged rightwardly of the vehicle width centerline C1 in order to avoid interference with the driving chain 19.

(2) Although in the above embodiments, the exhaust chamber 22 of the exhaust device is arranged in the lower space below the swing arm bracket portion 1a of the main frame 1 and the lower space below the front portion of the swing arm 7, a large-diameter catalytic pipe or exhaust collecting pipe can also be arranged. In addition, a member other than the configuring member of the exhaust device can be arranged.

(3) The swing arm 7 is not limited to a both end support type including the pair of right and left arm members 36, as shown in the above embodiment, and may be of a one end support type.

(4) Various modifications and changes can also be made without departing from the spirit and scope of the present invention as described in the claims.

What is claimed is:
1. A motorcycle comprising:
a multi-cylinder engine;
a main frame;
a swing arm for supporting a rear wheel in a rear portion of the main frame so as to be swingable in an up-down direction;
a rear suspension having one end rotatably supported by a portion located in a position above a swing axial support portion of the swing arm, the rear suspension suspending the swing from the main frame, and the rear suspension extending rearwardly in a position above the swing arm;
a link mechanism connecting the rear suspension and the swing arm, the link mechanism having a suspension arm rotatably supported by an upper portion of the swing arm and a link member having one end rotatably supported by the main frame, the suspension arm including a first pivot portion rotatably supporting the other end of the rear suspension and a second pivot portion rotatably connecting the other end of the link member;
an exhaust collecting pipe arranged below the multi-cylinder engine, the exhaust collecting pipe collecting a plurality of exhaust pipes;
an exhaust device having an exhaust chamber arranged in a space below the swing arm, the exhaust chamber being located posterior to the exhaust collecting pipe; and
an exhaust connecting pipe connecting an outlet of a rear end of the exhaust collecting pipe with a front surface of the exhaust chamber in a moving direction of the motorcycle,
wherein the rear suspension is positioned entirely above the swing arm.

2. The motorcycle as claimed in claim 1, wherein exhaust chamber is arranged so as to extend from a space below the main frame to the space below a front portion of the swing arm.

3. The motorcycle as claimed in claim 2, wherein the exhaust chamber has a substantially rectangular shape, and a height of the exhaust chamber in the up-down direction is less than the length of the exhaust chamber.

4. The motorcycle as claimed in claim 2, wherein the exhaust chamber protrudes upwardly toward a lower side of the swing arm.

5. The motorcycle as claimed in claim 1, wherein the exhaust chamber is supported by a lower portion of the main frame.

6. The motorcycle as claimed in claim 1, further comprising an exhaust pipe connected to an upstream end of the exhaust chamber, wherein the exhaust chamber is wider than the exhaust pipe in the vehicle width direction.

7. The motorcycle as claimed in claim 1, wherein the exhaust chamber has an exhaust port on a side surface thereof.

8. The motorcycle as claimed in claim 1, wherein an exhaust chamber attaching portion for attaching the exhaust chamber and a link attaching portion for attaching the link member are integrally formed on a member of the main frame.

9. The motorcycle as claimed in claim 8, wherein the member of the main frame forms a lower cross member of the main frame.

10. The motorcycle as claimed in claim 8, wherein the exhaust chamber attaching portion is arranged on a vehicle width centerline.

11. The motorcycle as claimed in claim 8, wherein the exhaust chamber has an attaching section formed on the front surface thereof, and the attaching section is attached to the exhaust chamber attaching portion of the member of the main frame.

12. The motorcycle as claimed in claim 1, wherein the exhaust chamber is wider than an exhaust pipe connected to an upstream end of the exhaust chamber in the vehicle width direction.

13. A motorcycle comprising:
a multi-cylinder engine;
a main frame;
a swing arm for supporting a rear wheel in a rear portion of the main frame so as to be swingable in an up-down direction;
a rear suspension having one end rotatably supported by a portion located in a position above a swing axial portion of the swing arm, the rear suspension suspending the swing arm from the main frame, and the rear suspension extending rearward in a position above the swing arm;
a link mechanism connecting the rear suspension and the swing arm, the link mechanism having a suspension arm rotatably supported by an upper portion of the swing arm and a link member having one end rotatably supported by the main frame, the suspension arm including a first pivot portion rotatably supporting the other end of the rear suspension and a second pivot rotatably connecting the other end of the the link member;
an exhaust collecting pipe arranged below the multi-cylinder engine, the exhaust collecting pipe collecting a plurality of exhaust pipes;
an exhaust device having an exhaust chamber arranged in a space below the swing arm, the exhaust chamber being located posterior to the exhaust collecting pipe; and
an exhaust connecting pipe connecting an outlet of a rear end of the exhaust collecting pipe with a front surface of the exhaust chamber in a moving direction of the motorcycle, wherein:
the main frame has two tool insertion openings at a position of the main frame corresponding to the one end of the rear suspension and the vicinity thereof, as seen in the vehicle width direction;

one of the tool insertion openings is constituted so that a bolt for mounting the rear suspension and a tool for rotating the bolt can be inserted through the opening; and the other of the tool insertion openings is constituted so that a tool for adjusting a adjusting screw of the rear suspension can be inserted through the opening.

* * * * *